(12) United States Patent
Droznin et al.

(10) Patent No.: US 8,943,037 B2
(45) Date of Patent: Jan. 27, 2015

(54) APPARATUS AND METHODS FOR PROVIDING ROUTE-BASED ADVERTISING AND VENDOR-REPORTED BUSINESS INFORMATION OVER A NETWORK

(71) Applicant: RouteCentric, Inc., Belmont, MA (US)

(72) Inventors: Vadim Droznin, Ormond Beach, FL (US); Michael Wanyo, Baltimore, MD (US)

(73) Assignee: RouteCentric, Inc., Belmont, MA (US)

( * ) Notice: Subject to any disclaimer, the term of this patent is extended or adjusted under 35 U.S.C. 154(b) by 0 days.

(21) Appl. No.: 14/175,568

(22) Filed: Feb. 7, 2014

(65) Prior Publication Data

US 2014/0156403 A1    Jun. 5, 2014

Related U.S. Application Data

(63) Continuation of application No. 13/623,936, filed on Sep. 21, 2012, now Pat. No. 8,650,176, which is a continuation of application No. 11/761,202, filed on Jun. 11, 2007, now Pat. No. 8,285,696.

(60) Provisional application No. 60/812,464, filed on Jun. 9, 2006.

(51) Int. Cl.
    *G06F 17/30*       (2006.01)
    *G06Q 30/02*       (2012.01)
    *G09B 29/00*      (2006.01)

(52) U.S. Cl.
    CPC ............ *G06Q 30/0259* (2013.01); *G06F 17/30* (2013.01); *G06Q 30/02* (2013.01); *G09B 29/007* (2013.01)

USPC .......... 707/706; 707/713; 707/722; 707/736; 707/758; 707/781

(58) Field of Classification Search
CPC ....................................................... G06F 17/30
USPC .................................................. 707/600–899
See application file for complete search history.

(56) References Cited

U.S. PATENT DOCUMENTS 5,948,040 A     9/1999   DeLorme et al. ............. 701/201
6,282,489 B1    8/2001   Bellesfield et al. .......... 701/201

(Continued)

OTHER PUBLICATIONS

ZipandShop, LLC, Web pages from website, http://www.zipandshop.com, 2006.

*Primary Examiner* — Isaac M Woo
(74) *Attorney, Agent, or Firm* — Sunstein Kann Murphy & Timbers LLP

(57) ABSTRACT

A method of providing advertising to a user or community of users over a network includes receiving from the user a query identifying a contemplated route, accessing a computer database of self-reported business information from vendors, each vendor having an identified geographic location, wherein the self-reported business information has been previously supplied by the vendors through an interface and stored in the database, wherein the interface is configured so that each vendor can also specify an advertising budget, providing to the user or community information from the database concerning the business information of a set of vendors extracted from the database on the basis of geographic proximity to the route identified by the user, and providing to the user or community advertising from the set of vendors based, at least in part, on data retrieved from the database and on advertising budgets supplied by the set of vendors.

13 Claims, 37 Drawing Sheets

(56) References Cited

U.S. PATENT DOCUMENTS

| | | |
|---|---|---|
| 6,336,073 B1 | 1/2002 | Ihara et al. .................... 701/202 |
| 6,498,982 B2 | 12/2002 | Bellesfield et al. ........... 701/202 |
| 6,965,872 B1 | 11/2005 | Grdina ............................ 705/26 |
| 7,577,244 B2 * | 8/2009 | Taschereau .............. 379/218.01 |
| 7,587,276 B2 | 9/2009 | Gold et al. .................... 701/211 |
| 8,650,176 B2 | 2/2014 | Wanyo et al. ................. 707/706 |
| 2002/0188506 A1 | 12/2002 | Smith .............................. 705/14 |
| 2004/0167706 A1 | 8/2004 | Becker .......................... 701/206 |
| 2005/0071417 A1 | 3/2005 | Taylor et al. .................. 709/200 |
| 2006/0238383 A1 | 10/2006 | Kimchi et al. ............. 340/995.1 |
| 2006/0253481 A1 | 11/2006 | Guido et al. .................. 707/100 |

\* cited by examiner

Self Report

Market Street Station

Address: 271 Market St.
City/Town: Brighton  State: MA  Zip Code: 02135

[Confirm Station] [Log Out]

Enter Current Prices

Regular: $2.20  Mid-Grade: $2.30  Super: $2.40  Diesel: $3.10
Other:

[Confirm] [Reset]

Please Check Other Services Offered At Your Location

- ☐ Convenience Store
- ☐ Mass. State Inspection
- ☐ Service Bay
- ☐ Auto Care
- ☐ Car Wash
- ☐ Beer/Wine
- ☐ Lottery
- ☐ ATM
- ☐ Open 24 Hours
- ☐ Propane
- ☐ Truck Stop
- ☐ Full Service
- ☐ Air
- ☐ Restrooms

[Post Data]

*FIG. 15*

Manage Accounts

Looking for someone work Labor Day weekend; Be courteous to our customers; ...

[Edit Personal Display] [My Contacts]

[GasTrip Tech Support]

| | | | | Employees' Work Schedule | |
|---|---|---|---|---|---|
| BMS002 | Bill | [Change Password] [Delete] | | Monday | Bill/Jen |
| BMS003 | John | [Change Password] [Delete] | | Tuesday | John/Bill |
| BMS004 | Jen | [Change Password] [Delete] | | Wednesday | Bill/Jen |
| BMS005 | Mike | [Change Password] [Delete] | | Thursday | Mike/John |
| BMS006 | Steve | [Change Password] [Delete] | | Friday | Steve/Mike |
| BMS007 | Ron | [Change Password] [Delete] | | Saturday | Jen/Ron |
| | | | | Sunday | Bill/Ron |

[Save Accounts] [Add Account]     [Save Schedule]

*FIG. 16*

Web Station

Market Street Gas Station
127 Market Street
Brighton, MA 02135

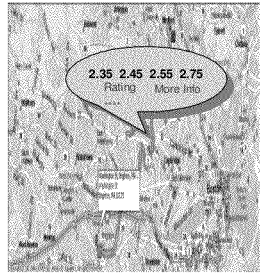

2.35 2.45 2.55 2.75
Rating   More Info

Click here for Directions

| Gas Station Pictures | |
|---|---|
| | Edit Pictures |

| Services | About This Station |
|---|---|
| Edit Services | Edit About This Station |

☀ 74°F Brighton
Sunny

Rating

★ ★ ★ ★

Read Reviews (46)
Post Response

Hours of Operation
| | |
|---|---|
| Monday | 7AM – 11PM |
| Tuesday | 7AM – 11PM |
| Wednesday | 7AM – 11PM |
| Thursday | 7AM – 11PM |
| Friday | 7AM – 11PM |
| Saturday | 7AM – 11PM |
| Sunday | 7AM – 7PM |

Contact Info
Phone: 555-123-4567
Fax: 555-123-5678

Edit Contact info and Hours

Home   Who We Are   Mobile Route   Saved Routes   News   Disclaimer   Market News

*FIG. 17*

Web Station

Market Street Gas Station
127 Market Street
Brighton, MA 02135

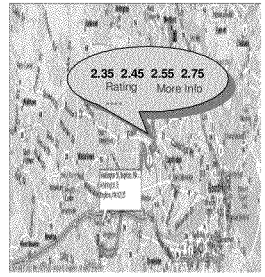

2.35 2.45 2.55 2.75
Rating   More Info

Click here for Directions

| Gas Station Pictures |
|---|

| Services | About This Station |
|---|---|

☀ 74°F Brighton
Sunny

Rating

★ ★ ★ ★

Read Reviews (46)

Hours of Operation
| | |
|---|---|
| Monday | 7AM – 11PM |
| Tuesday | 7AM – 11PM |
| Wednesday | 7AM – 11PM |
| Thursday | 7AM – 11PM |
| Friday | 7AM – 11PM |
| Saturday | 7AM – 11PM |
| Sunday | 7AM – 7PM |

Contact Info
Phone: 555-123-4567
Fax: 555-123-5678

Home   Who We Are   Mobile Route   Saved Routes   News   Disclaimer   Market News

*FIG. 18*

GusCulator

Savings to date: $412.30

- Home
- Blog
- Personalize
- Weekend
- Vacation
- GusCulator
- Daily News

Plan My Fill Ups

| | |
|---|---|
| Highest Price | $2.52 |
| Lowest Price | $2.35 |
| Gallons | 20 |
| Savings | $3.40 |

E-Mail to Friend | What If ???

Weekend | Vacation | Commute | Other

Testimonials

Wow...I saved over $20.00 by using *My Fill Ups* last trip! – Debbie, TX

At the rate I am saving I'll be able to afford my dream vacation after all! - Paul, MN Oil +0.25  Natural Gas +1.03  Market St. Gulf -.03  Brighton Shell -0.1

*FIG. 23*

Plan My Fill Ups

- Home
- Blog
- Personalize
- Weekend
- Vacation
- GusCulator
- Daily News

Please choose or add a new Vehicle

Hybrid
Luxury
SUV
Motor Cycle
Create New Vehicle

Please type in or select average MPG | Please type in or select fuel tank size

| | |
|---|---|
| Other | Other |
| 50 MPG | 30 Gallons |
| 25 MPG | 23 Gallons |
| 12 MPG | 12 Gallons |
| 80 MPG | 5 Gallons |
| I don't know please get vehicles Manufacturers data | I don't know please get vehicles Manufacturers data |

Weekend | Vacation | Commute | Other | Search

Testimonials

My Fill Ups makes it easy. No more worries about where to stop for fuel! – TJ, CA Home | Who We Are | Mobile Route | Saved Routes | News | Disclaimer | Market News

*FIG. 24*

Registration

Name

Address 1

Address 2

City/Town       State    Zip Code

Phone Number      Username

Email Address     Password (Up to 10 Characters)    Birthday (DD/MM/YYYY)

Confirm Email Address    Confirm Password
- ○ Male
- ○ Female

[Read Terms of Service]
- ○ I agree
- ○ I do not agree

[Register]

Home    Who We Are    Mobile Route    Saved Routes    News    Disclaimer    Market News

AdRoute

What you're Advertising (what is this?)

| Burger | $$$ | Other | $$$ |
| Surf & Turf | $$$ | Other | $$$ |
| Veggie | $$$ | Other | $$$ |
| Pizza | $$$ | Other | $$$ |

Business Name

Address

City/Town  State  Zip Code

Add text (Up to 50 Characters) (what is this?)

[ Enter ]  [ Update ]

Advertising Budget (what is this?)
- ○ Regular Member    $30      ($0.30/ad and 500ft radius from route)
- ● Mid-Grade Member  $90      ($0.10/ad and 1 mile radius from route)
- ○ Super Member      $200     ($0.05/ad and 5 mile radius from route)
- ○ Other             $...     (Minimum $0.01/ad)
- ○ Yearly            $1,000   (Unlimited ads and 5 mile radius)

Remaining Budget
$80.21

AdRoute Help!

[ Post Ad ]

Home   Who We Are   Mobile Route   My Routes   News   Disclaimer   Market News

*FIG. 47*

APPARATUS AND METHODS FOR PROVIDING ROUTE-BASED ADVERTISING AND VENDOR-REPORTED BUSINESS INFORMATION OVER A NETWORK

CROSS-REFERENCE TO RELATED APPLICATIONS

This patent application is a continuation of U.S. patent application Ser. No. 13/623,936 filed Sep. 21, 2012, now U.S. Pat. No. 8,650,176, which is a continuation of U.S. patent application Ser. No. 11/761,202 filed Jun. 11, 2007, now U.S. Pat. No. 8,285,696, which claims the benefit of U.S. Provisional Patent Application No. 60/812,464 filed Jun. 9, 2006, the disclosures of which are incorporated by reference herein in their entirety.

TECHNICAL FIELD

The present invention relates to apparatus and methods for providing route-based advertising and vendor-reported business information to a user over a network.

BACKGROUND ART

With the irregular rise and fall of the fuel prices in the market today, a vehicle operator is faced with uncertainty of purchasing power at the fuel pump. This has created a demand for up-to-date information about fuel stations' prices. Moreover, wireless technology is creating an environment where an operator may obtain information instantaneously.

Currently there are several businesses that maintain a database of fuel stations and prices. The operator may obtain this information based on a specific location, zip code, street intersection, combination of longitude and latitude, City, State, County, and Country. The method which these models employ displays information that may be outdated and, therefore, inaccurate. There are two primary methods of updating the database of fuel prices:
1. Spotter networks: This business model utilizes a network of people (spotters) that relay the fuel price information directly to the database via the Internet sites.
2. OPIS (Oil Price Information Service) networks: Internet sites obtain fuel price information based on credit card data, feeds from participating retail chains, and other survey methods collected by OPIS database.

These methods do not address the current needs of the daily fluctuating fuel price market. Spotter networks provide prices that may be several days old and may be susceptible to bias and input error by the person reporting the fuel prices. OPIS based Internet sites gather information assuming that 80% of the fuel purchased is regular unleaded gasoline, thus providing an approximate value of regular unleaded gasoline. Moreover, other grades or types of fuel may often be ignored.

SUMMARY OF THE EMBODIMENTS

One embodiment of the invention includes a method of providing advertising to a user or community of users over a network. The method includes receiving from the user a query identifying a contemplated route, accessing a computer database of self-reported business information from vendors, each vendor having an identified geographic location, wherein the self-reported business information has been previously supplied by the vendors through an interface and stored in the database, wherein the interface is configured so that each vendor can also specify an advertising budget, providing to the user or community of users, over the network, information from the database concerning the business information of a set of vendors extracted from the database on the basis of geographic proximity to the route identified by the user, and providing to the user or community of users, over the network in response to the query, advertising from the set of vendors based, at least in part, on data retrieved from the database and on advertising budgets supplied by the set of vendors.

Another embodiment of the invention includes a computer system for providing information about vendors to a user or community of users. The computer system includes a digital storage medium in which is stored a computer database of self-reported business information and an advertising budget supplied by the vendors through an interface, each vendor having an identified geographic location that is stored in the database, and the computer system is running processes that include receiving from the user a query identifying a contemplated route, accessing the computer database, providing to the user or community of users, over the network, information from the database concerning the business information of a set of vendors extracted from the database on the basis of geographic proximity to the route identified by the user, and providing to the user or community of users, over the network in response to the query, advertising from the set of vendors based, at least in part, on data retrieved from the database and on advertising budgets supplied by the set of vendors.

In related embodiments, the network may include the internet, a wireless telephone network, a telephone network and/or a GPS network. The business information may include vehicular fuel prices. The information provided to the user or community of users may be prioritized on the basis of ratings provided by users. The query may further identify product information and the provided information may be further extracted from the database on the basis of the product information identified by the user. The method may further include pricing the advertising based, at least in part, on distance of each vendor's geographic location from the contemplated route. The information provided to the user or community of users may allow the user or community of users to share the business information.

BRIEF DESCRIPTION OF THE DRAWINGS

The foregoing features of embodiments of the invention will be more readily understood by reference to the following detailed description, taken with reference to the accompanying drawings, in which:

FIG. 15 is a representation of a web page designed to allow businesses to provide, input, and modify business information in accordance with an embodiment of the present invention;

FIG. 16 illustrates links such as shown and described in FIG. 13 in accordance with an embodiment of the present invention;

FIG. 17 illustrates an embodiment of the present invention by which a business may personalize the web pages that are viewed by users on the website;

FIG. 18 is a representation of a web page designed to allow users to view business information about a business in accordance with an embodiment of the present invention;

FIG. 23 displays an embodiment of the present invention where the user and/or company may employ a savings tool that displays the estimated monetary savings along a specified route as described and shown in FIG. 9;

FIG. 24 is a representation of a web page by which the user may provide information pertinent to the processes described and shown in FIG. 4 in accordance with an embodiment of the present invention;

FIG. 47 displays an embodiment of the present invention that allows a business to bid for a display of advertisements via the network enabled device.

DETAILED DESCRIPTION OF SPECIFIC EMBODIMENTS

Figure 1:
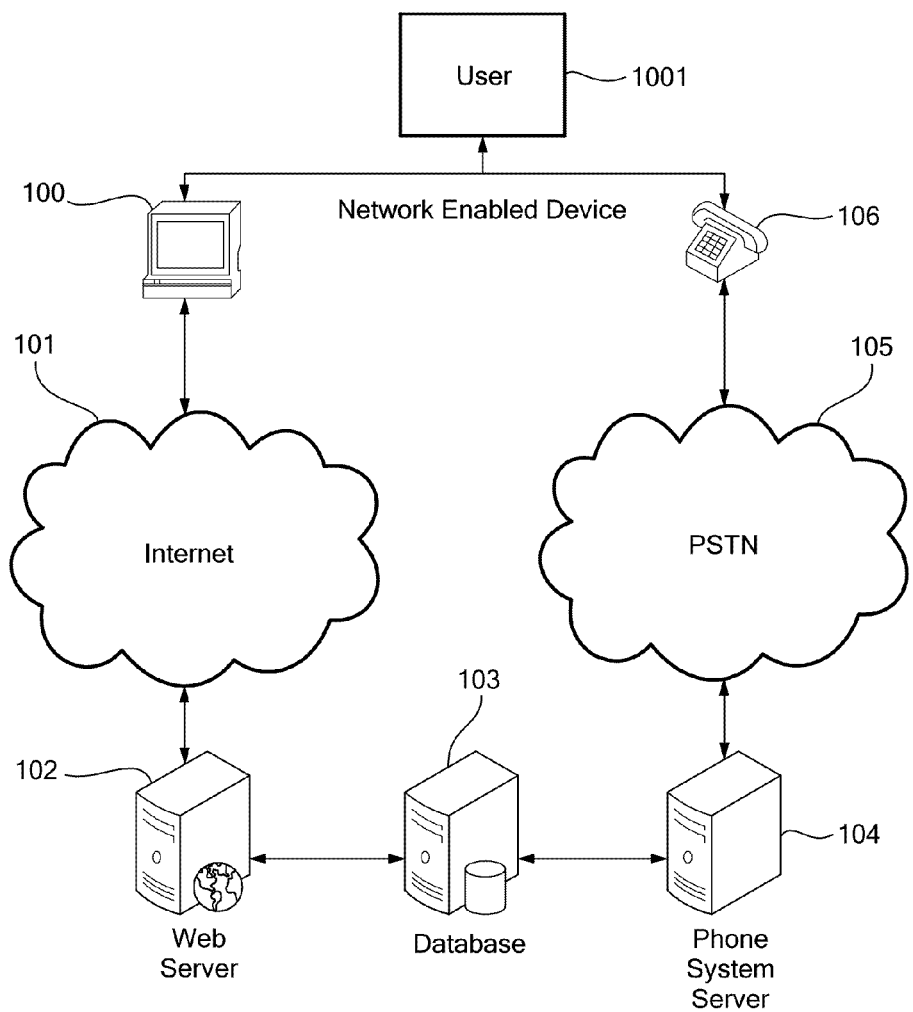
FIG. 1 illustrates a system for providing route-based advertising and vendor-reported business information to a user over a network according to an embodiment of the present invention.

Definitions. As used in this description and the accompanying claims, the following terms shall have the meanings indicated, unless the context otherwise requires:

"selecting on the basis of proximity of geographic location to a route": includes using geographic parameters associated with one or more intermediate portions of the route and with the geographic location to assess physical distance between the location and each intermediate portion as part of the section process.

"network enabled device" is a device such as a personal computer, office computer, PDA, telephone, GPS enabled mobile device, mobile phone, or web enabled cell phone, that is coupled to a communication network. The network may, for example, include a telephone network, mobile network, such as a GPS or wireless telephone network, an internet protocol (IP) network or any combination of these types of networks.

"business" refers to a vehicular fuel dealer, or any business having at least one point of sale at a geographic location.

"business information" refers to information pertinent to a business, including, for example, services offered by the business and prices of items such as vehicular fuel offered for sale.

"company" refers to an organization that utilizes an embodiment of the present invention for the purpose of planning refueling stops for a fleet of vehicles, and wherein a group of users affiliated with the organization may obtain location information for such refueling stops over a network.

"community" refers to two or more users that utilize an embodiment of the present invention for the purpose of sharing and rating business information.

Embodiments of the present invention allow a user or a community of users to obtain business or vendor information, such as product information and/or cost, fuel prices, current sales/discounts or coupons, hours of operation, address, telephone number, etc. from a variety of businesses along their contemplated route. Embodiments also allow a user or community to search across multiple business categories. Other services list this information based on a radius around an address, zip code, or the endpoint of a route. Embodiments of the present invention display the desired information at specified distances from the contemplated route. Embodiments allow a driver or community of drivers to increase efficiency by not having to deviate too far from their planned route.

Embodiments of the present invention expand the business listing beyond the radius, allowing the user or community to view a greater number of businesses, if desired. The user or community also has the ability to post ratings and feedback about particular businesses. The businesses with higher ratings may be rewarded by gaining listing priority along the route. A user may also conduct a product-based query that locates particular products along the contemplated route.

Many small, local businesses lack the resources or the platform to get their business noticed by consumers. While they may maintain their own website, they are not generating enough traffic to propel their business. Embodiments of the present invention allow those businesses to create a web space if they do not already have one as well as using highly targeted route-based advertisements to gain exposure.

FIG. 1 illustrates an embodiment of the present invention. A server 102 is accessed by a user 1001, through the use of network enabled device 100 over a network, which may include the internet 101. In one embodiment the server 102 serves web pages over the World Wide Web. Upon receiving a suitable request for desired information, the web server 102, queries a database 103, and extracts the requested information. The extracted information is then offered back to the device 100 over the network, for example, as a displayable web page, via the server 102, and is displayed on the network enabled device. The information may be any business information, such as product information and/or cost (e.g., fuel grade and price), current sales or discounts offered, hours of operation, address, telephone number, etc.

As an alternative to using an IP network, or in addition to using an IP network, the embodiment may employ a wired or wireless telephone network. In this context, the user may query the database through a telephone 106 over, for example, the public switched telephone network (PSTN) 105. The telephone system server 104 on receipt of a suitable request over the PSTN, containing relevant route information from the user 1001, queries the database 103 and extracts the requested information. The resulting information is relayed to the user over the PSTN to the phone 105. This service allows the user to access information in the database while en route and without access to the Internet.

Figure 11:
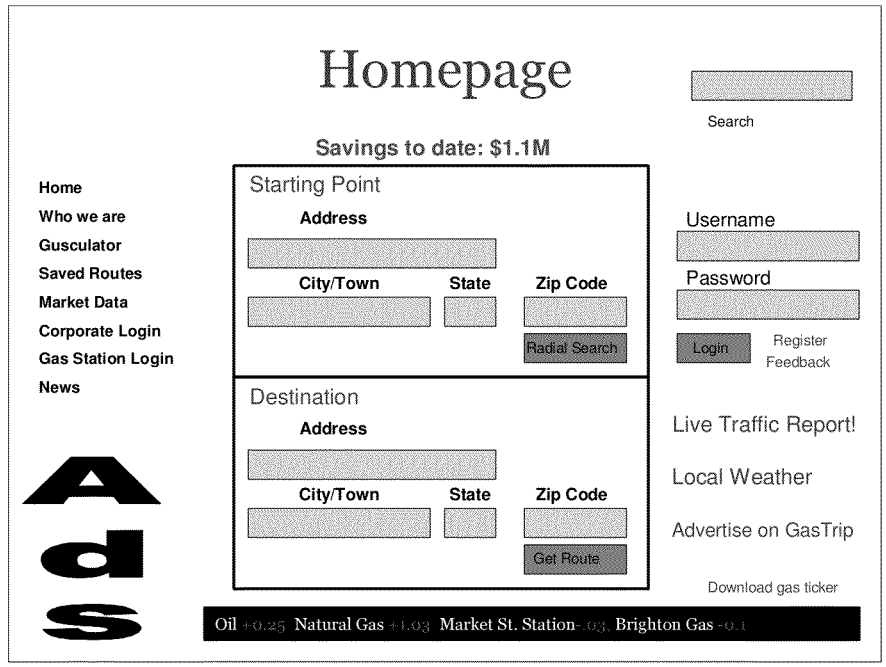
FIG. 11 is a representation of a web page providing a user interface in accordance with an embodiment of the present invention.

FIG. 11 is a representation of a web page providing a user interface in accordance with an embodiment of the present invention. By accessing this interface with a network enabled device, the user may indicate the starting position of the route and the destination address. In addition, a user may register via this interface to create an account so that the user may store a variety of preferences. Once registered, a user can login to the interface by entering a unique username and password. Relevant market data is also displayed and updated in a ticker style format at the bottom of the interface. Navigational links provide shortcuts to server webpages over the world wide web.

Figure 12:
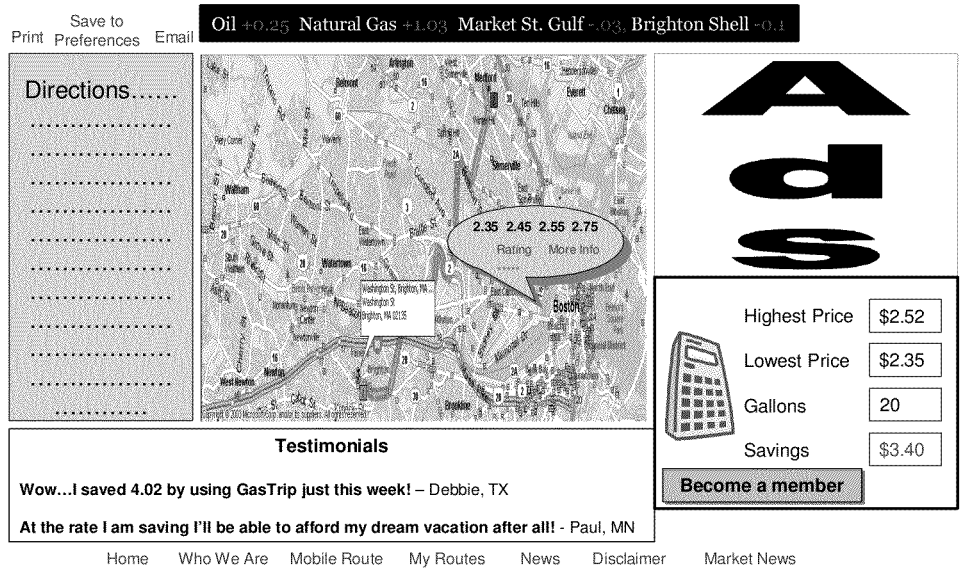
FIG. 12 is a representation of a web page that provides the route resulting from the user's starting and destination information as shown in FIG. 11.

In response to information entered by the user as described above in connection with FIG. 11, a new web page will be downloaded from the server by the user's device as illustrated in FIG. 12. This web page provides the route resulting from the user's starting and destination information in FIG. 11. The driving directions along with a pictorial diagram of the desired route are displayed. Also provided on this web page are locations of dealers or vendors (e.g., fuel stations) with requested products (e.g., vehicular fuel) along the route. In one embodiment, the display is of locations of vendors within a pre-determined distance from the route having the best price of the product and/or service (e.g., most economical fuel prices). Optionally in this embodiment, a savings tool displays the estimated monetary savings by using the suggested vendor locations along the specified route. In another embodiment, the display may be of locations of vendors selected on a desired basis, such as, for example, brand. In further related embodiments, product prices for each location along the route are displayed. In another related embodiment, the product prices are displayable by, for example, using a mouse to move a graphical selection icon in the vicinity of the relevant location. In a further related embodiment, the user may obtain other business information pertaining to the dealer by selecting a convenient navigational link.

Figure 2:
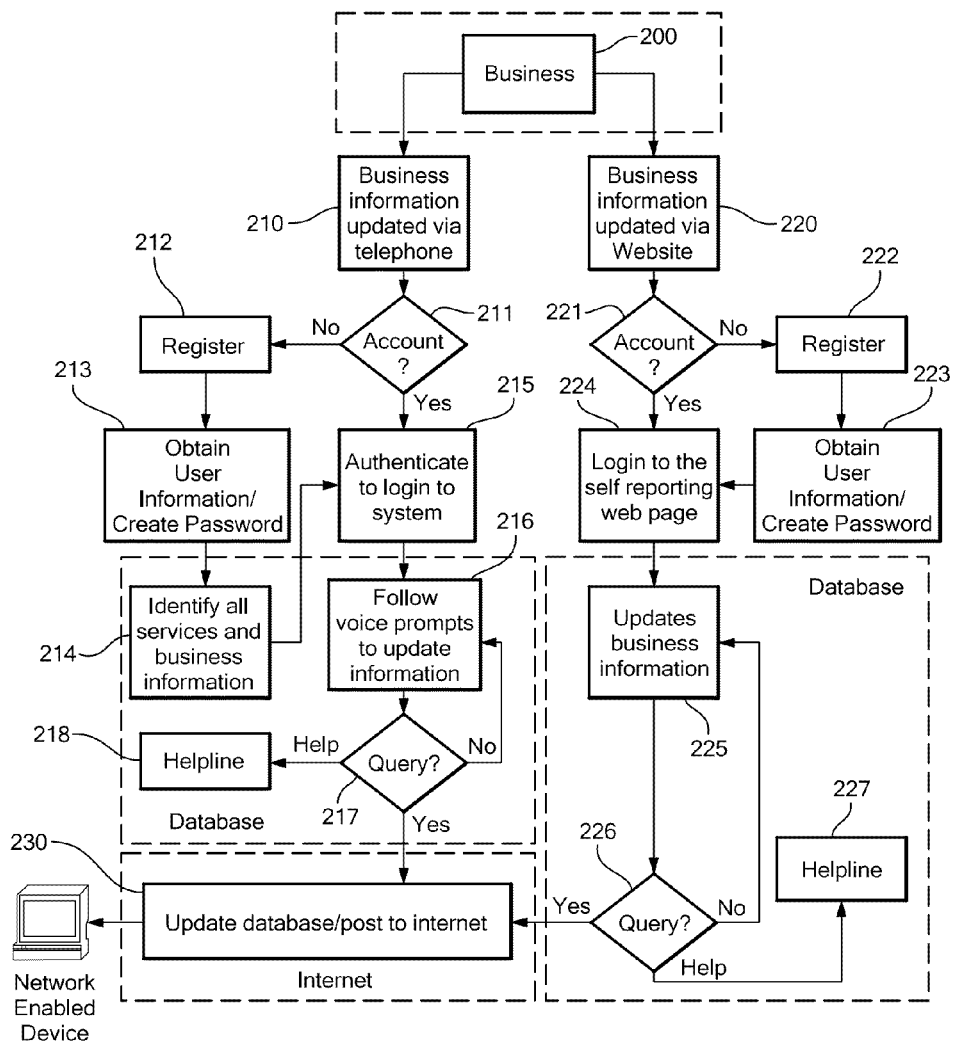
FIG. 2 illustrates a mechanism for a business to self report business information to a database according to an embodiment of the present invention.

FIG. 2 illustrates an embodiment of the present invention by which is implemented a mechanism for a business to self report business information to a database. The business information may be entered by a business 200, for example, using one of two methods outlined in FIG. 2. Using a telephone 210, a business may modify business information stored in the database. The business is prompted in process 211 to register or provide an account number. To register in process 212 a business provides contact information and creates a password, in accordance with process 213. The business will then identify services related to its operations in process 214. Following a successful authentication in process 215, the business may update business information via process 216. Finally, a business either confirms and posts the information to the database 230, chooses to modify the information, or requests help in process 217, through the helpline process 218.

Business information may also be updated via the website 220. Using the website 220, a business 200 may modify business information. A business, 200, is prompted in process 221 to register or provide an account number. Using the registration process 222, a business provides contact information and creates a password 223. Following a successful authentication in process 224, the business may provide or update business information through process 225. Finally, a business either confirms and posts the information to the database 230, modifies the information, or requests help in process 226, via the helpline process 227.

FIG. 15 is a representation of a web page in accordance with an embodiment of the present invention designed to allow businesses to provide, input, and modify business information (for example, product prices). In one embodiment, the geographic location and business name may be provided and/or modified by the business upon successful login. Once the business name and location are confirmed, the business may input or modify product prices. Optionally in this embodiment a business may input and/or modify any business information (for example, a fuel dealer may indicate the availability of a Convenience Store; and a business may identify product offerings, such as Auto Parts). In a further related embodiment, the business may update the computer database of self-reported business information by selecting a convenient navigational link.

Figure 3:
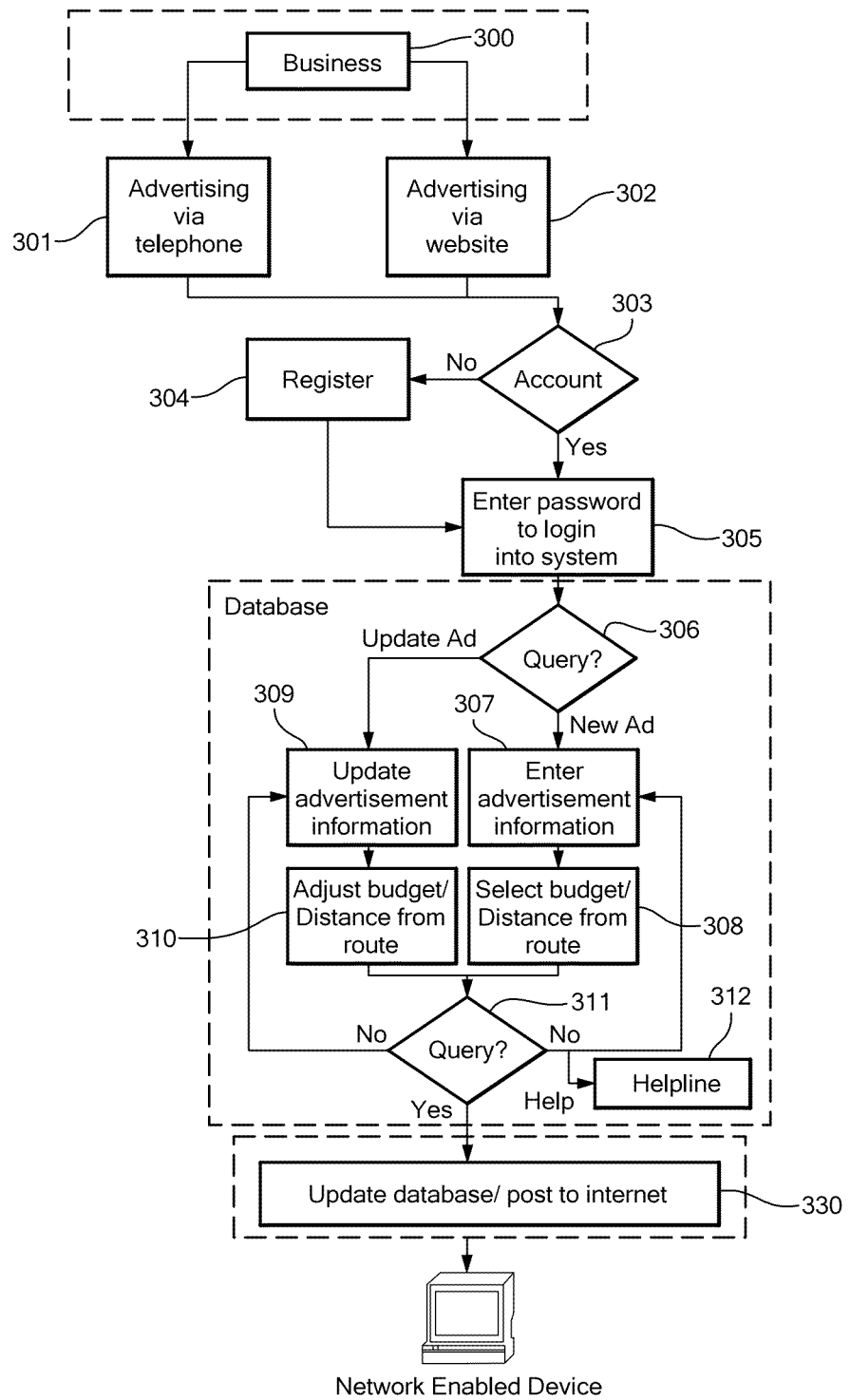
FIG. 3 illustrates an embodiment of the present invention by which a business may engage in posting and advertising along a user-identified route.

FIG. 3 illustrates an embodiment of the present invention by which a business may engage in posting and advertising along a user-identified route. Advertisements are displayed on a network enabled device by a business targeting a user 1001 who has specified a route in a manner described herein. Businesses may post an advertisement via telephone or the website. A business 300 using a telephone 301 is prompted in process 303 to register or provide an account number. To register, a business provides account information and creates a password using process 304. A business using the web site 302 is prompted in process 303 to register or provide an account number. To register, a business provides account information and creates a password in process 304. Following a successful authentication as identified in process 305 the business is prompted in process 306 to update a current advertisement or create a new advertisement. To create a new advertisement, a business enters the business information to be advertised in process 307. The business then selects a budget and/or distance from a user identified route 308. Finally, a business is queried in process 311 to either confirm and post the information to the database 330, modify the information in process 309, or request help via helpline by using process 312. To modify an advertisement, a business enters the updated business information in process 309. The business may modify the budget and/or distance from a user identified route 310. Finally, a business either confirms and posts the business information to the database 330, modifies the business information, or request help in process 311, via the helpline process 312.

Figure 14:
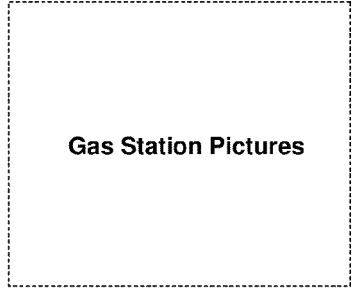
FIG. 14 illustrates a typical webpage designed to assist a business in posting and advertising along a specified route as described in FIG. 3 in accordance with an embodiment of the present invention.

FIG. 14 illustrates a typical webpage designed to assist a business in posting and advertising along a specified route described in FIG. 3. In one embodiment, a business name and geographic location may be entered or updated. In a related embodiment, an existing template containing business information may be modified. In another embodiment, a business may input a limited amount of text to be included in the advertisement. Optionally in this embodiment, distance from a specified route and/or price per advertisement determines the advertising budget. The remaining budget is displayed for the business to monitor. In a further related embodiment, the business may then post the advertisement as specified in FIG. 3.

Figure 4:
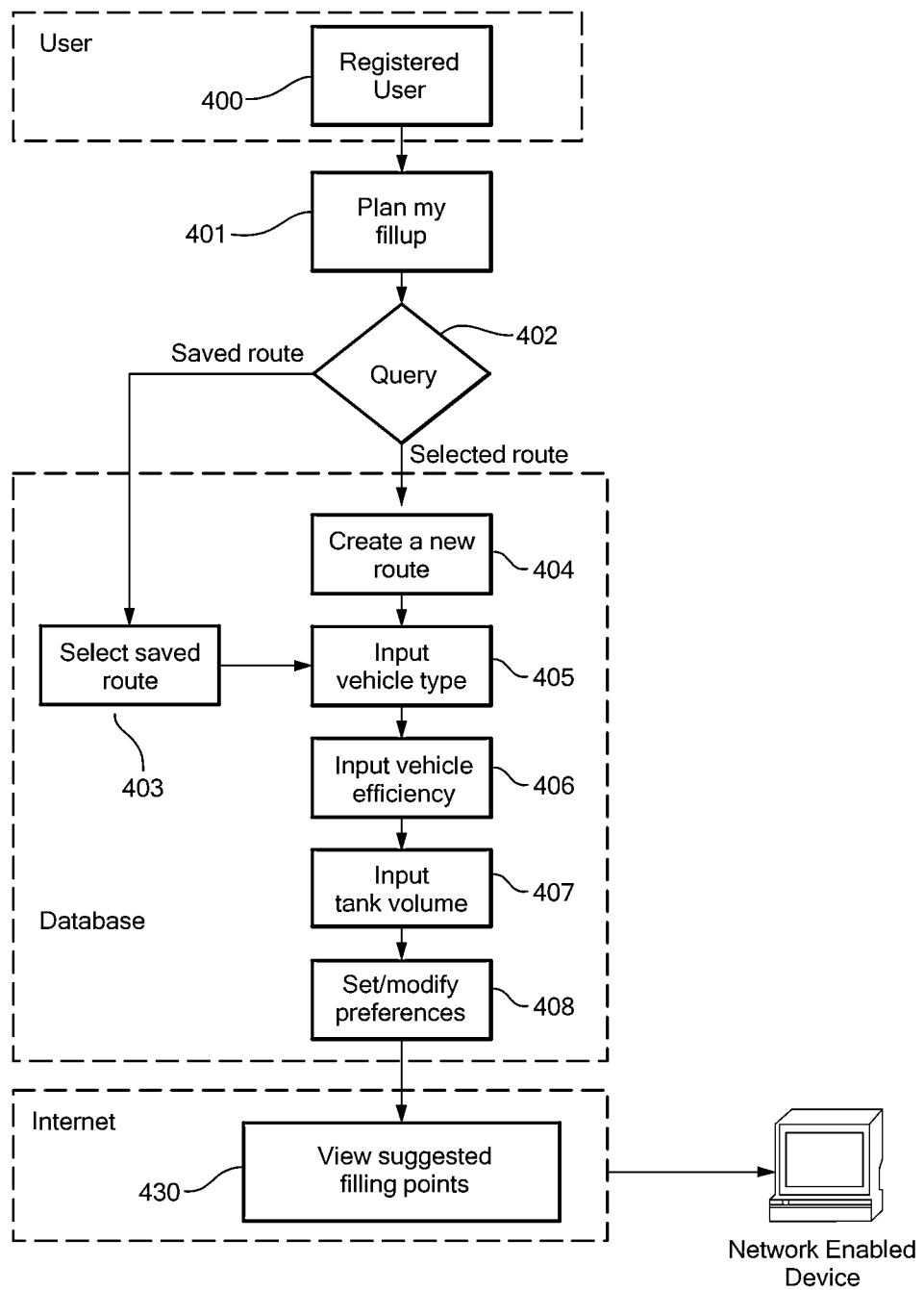
FIG. 4 illustrates an embodiment of the present invention by which a user obtains suggested refueling points along a user-identified route.

FIG. 4 illustrates an embodiment of the present invention by which a user obtains suggested refueling points along a user-identified route. In this embodiment, a user 400 accesses a web page in process 401 by which the user obtains information about scheduled fuel stops along a user-identified route. The user is queried via process 402 as to which route to reference. The user may select a previously saved route by going through process 403 or create a new route in process 404. The user will then input or select a vehicle type in process 405, or otherwise permit or provide estimation in process 406 of fuel efficiency of the vehicle and, in process 407, of fuel tank capacity. Finally, the user may modify refueling preferences in process 408. In process 430, these parameters are used in accessing a database of fuel vendors to determine suggested fueling locations, which are provided via a web page over the Internet to the user's device for display.

FIG. 24 is a representation of a web page in accordance with an embodiment of the present invention by which the user may provide information pertinent to the processes described in FIG. 4. In this embodiment, the user may specify the vehicle or vehicles to travel the user specified route. In a related embodiment, vehicle information, for example fuel efficiency and/or tank volume may be specified. User may choose a stored route or a new specified route to display fueling stops as described in FIG. 4. Navigational links provide shortcuts to server WebPages and advertisements over the world wide web.

Figure 5:
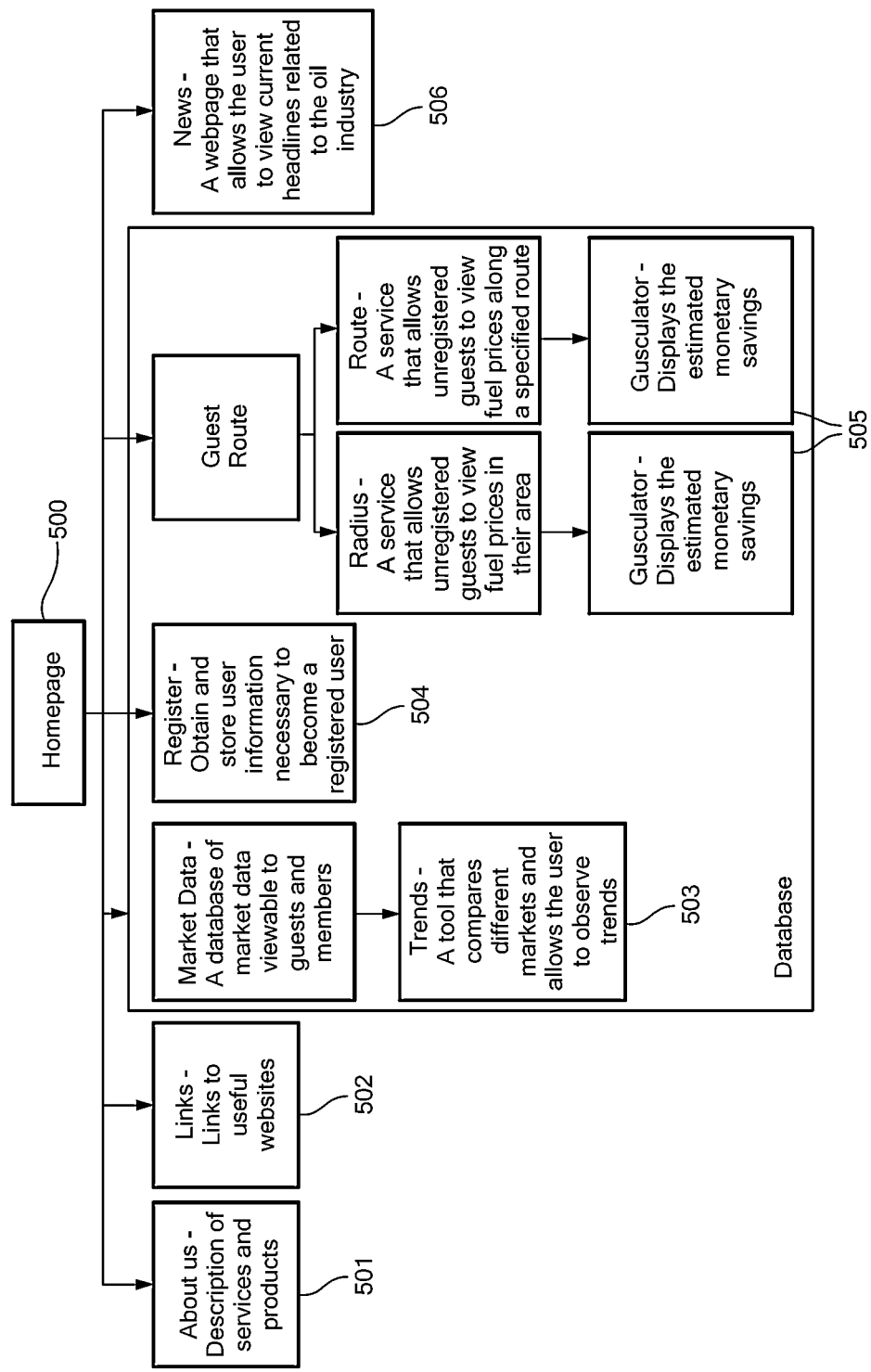
FIG. 5 provides a map of pages accessible from a web site in accordance with an embodiment of the present invention.

FIG. 5 provides a map of pages accessible from a web site in accordance with an embodiment of the present invention. The homepage 500 serves as the starting point. The user may choose to view information about provided services on page 501, access useful links on page 502, observe market data and trends on page 503, register to be a member on page 504, access business information, such as fuel prices, for given search on page 505, or view current industry news headlines on page 506.

Figures 29, 30:
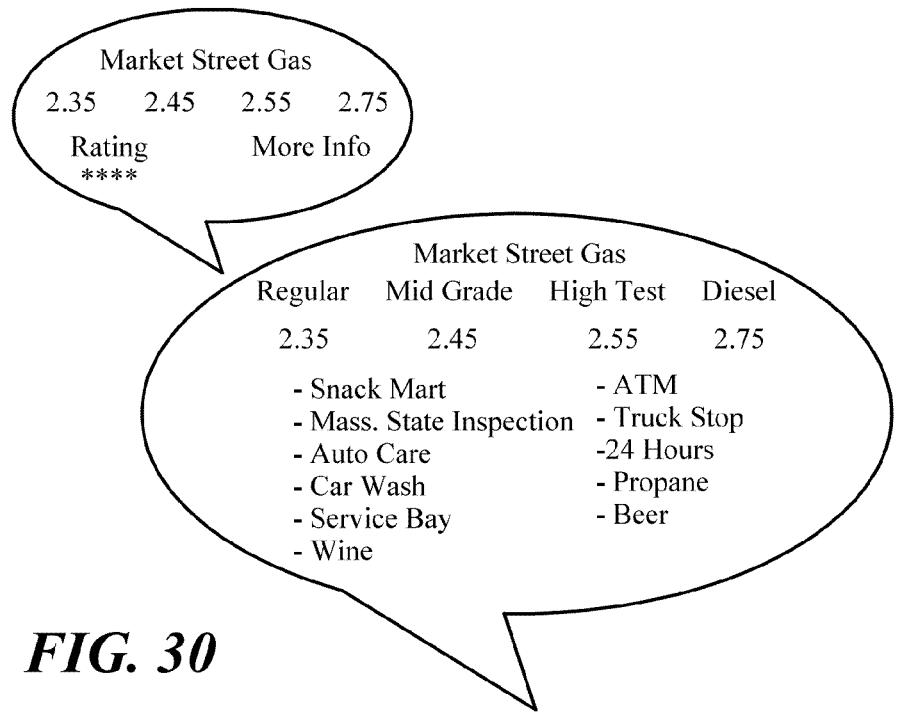
FIG. 29 illustrates a web page by which a user registers for an account through the website in accordance with an embodiment of the present invention.
FIG. 30 displays an embodiment of the present invention where the user and/or company may employ a tool that displays the business information along a specified route.

FIG. 29 illustrates a web page in accordance with an embodiment of the present invention by which a user registers for an account through the website as discussed in process 504 in FIG. 5. In the present embodiment, a user enters contact information such as name, address, mobile phone number, and email address. Optionally in this embodiment, the user may also create a unique username and password or have one automatically generated. The user also retains the option to enter in birthday and gender information. In this embodiment, upon agreeing to the terms of service, the user becomes a registered member.

Figure 6:
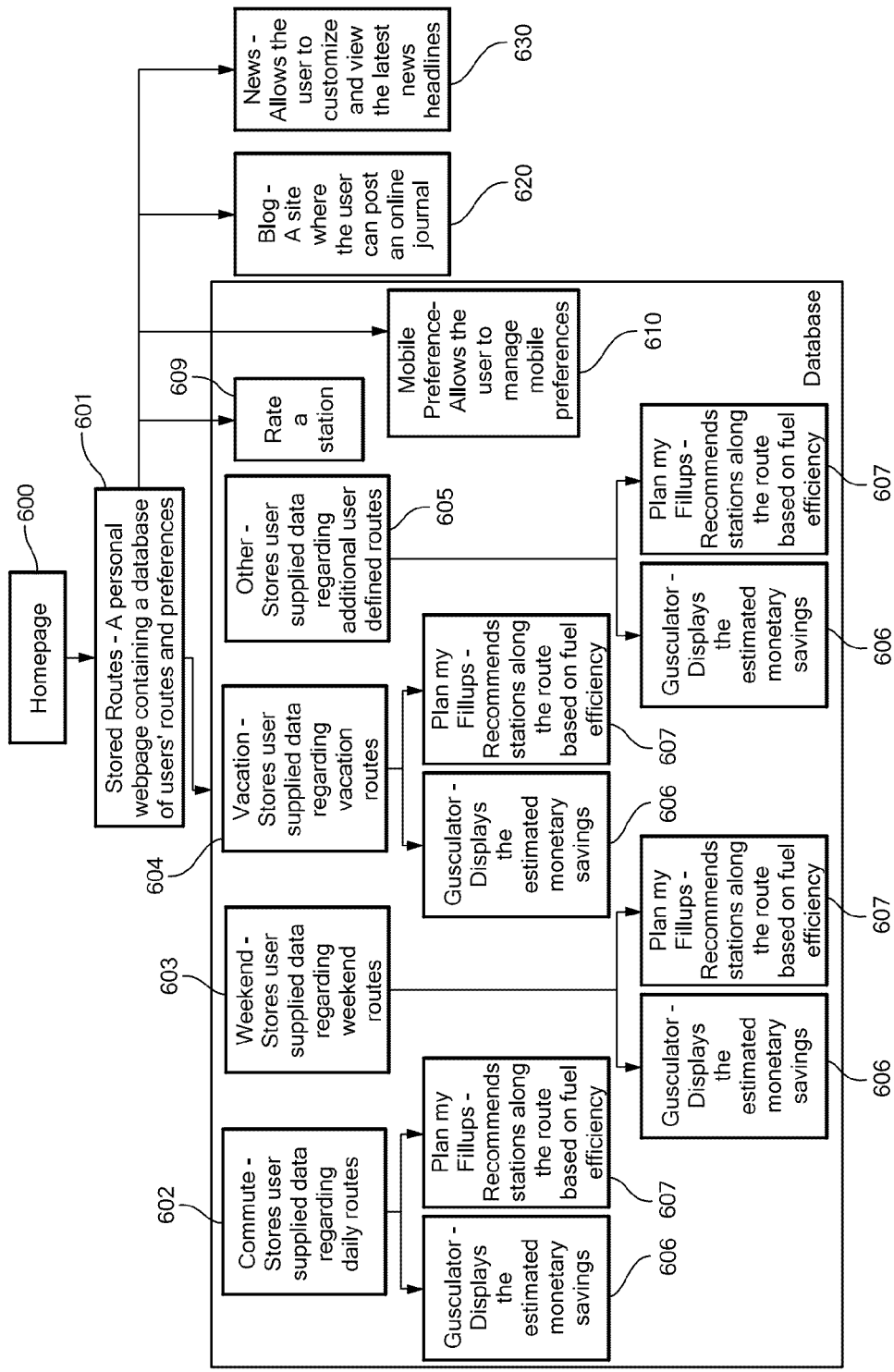
FIG. 6 illustrates an embodiment of the present invention by which a user may personalize the web pages.

FIG. 6 illustrates an embodiment of the present invention by which a user may personalize the web pages. From the homepage 600 a user will be prompted to enter user name and password to login to the Stored Routes website 601. At this point, the user may identify and store routes. For example, three types of routes may be used, Commute 602, Weekend 603, and Vacation 604. The user may also identify, store, and title as many other routes as desired under Other 605. Once a route is selected, user may access a number of tools. The Gusculator 606 is a tool that displays and stores savings achieved using this embodiment. Plan My Fillups 607 recommends stations along a user identified route based on fuel efficiency. Rate a Station allows user to rate a business. A user may also modify mobile preferences in process 610, via the website. This will allow the user to change how mobile alerts and/or routes are received. A customizable blog or an online journal 620 may be accessed by a user. Users may personalize news headlines on page 630.

Figures 19, 20:
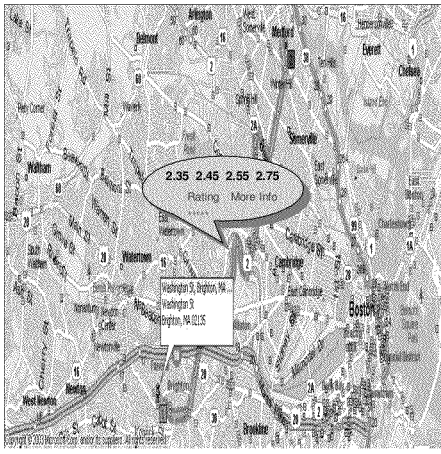
FIG. 19 is a representation of a web page designed to allow the user to store previously viewed routes and personalize a webpage as described and shown in FIG. 6 in accordance with an embodiment of the present invention.
FIG. 20 illustrates an embodiment of the present invention by which a user may view a previously specified commute route.

FIG. 19 is a representation of a web page in accordance with an embodiment of the present invention designed to allow the user to store previously viewed routes and personalizes a webpage as described in FIG. 6. In the present embodiment, the process is initiated by the user entering a starting point and destination address. The user may choose to view the specified route and/or store it to the saved routes drop down menu. In a related embodiment, the user is then prompted to identify the saved route. Optionally in this embodiment, in subsequent sessions the user may select a stored route by name or create a custom route by using the starting point and the destination drop down menus. Once a route is specified, the user is directed to Server Pages on the World Wide Web.

FIG. 20 illustrates an embodiment of the present invention by which a user may view a previously specified commute route. In a related embodiment similar to FIG. 12, this webpage displays a pictorial diagram of the route. In a subsequent embodiment, the most economical fuel prices within a pre-determined distance from the route are displayed in addition to the fuel station's rating. In another related embodiment, the user may obtain other business information by selecting a convenient navigational link. A related embodiment displays a savings tool that estimates monetary savings by using the suggested fueling points along the specified route. In addition to these features, the webpage offers other relevant information, for example, weather, directions, and traffic conditions. A user may choose additional features displayed in the navigation bar, for example "blog." Market data is also displayed and updated in a ticker style format at the bottom of the interface.

Figure 21:
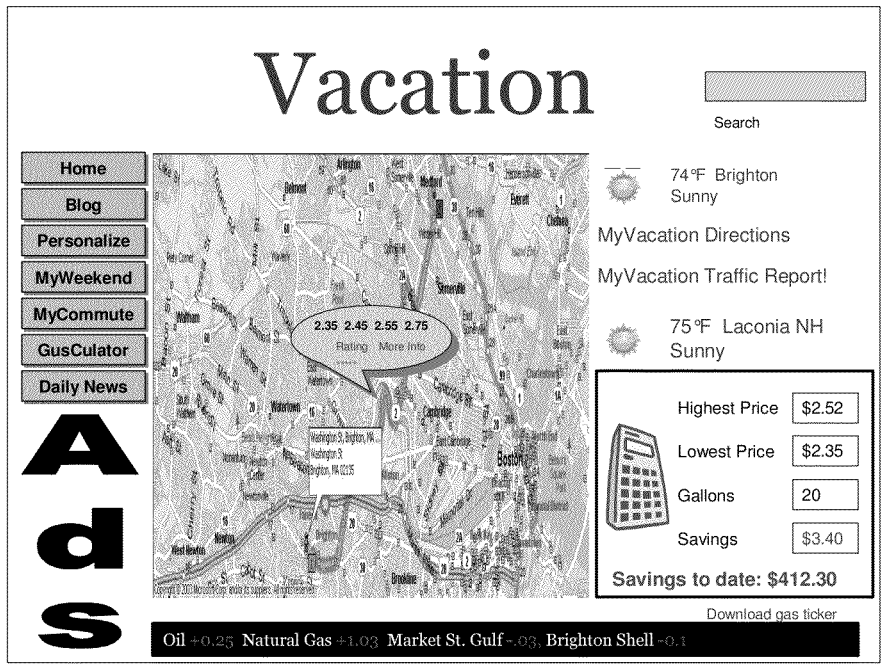
FIG. 21 illustrates an embodiment of the present invention by which a user may view a previously specified vacation route.

FIG. 21 illustrates an embodiment of the present invention by which a user may view a previously specified vacation route. In a related embodiment, similar to FIG. 20, this webpage displays a pictorial diagram of the route. The most economical fuel prices within a pre-determined distance from the route are displayed in addition to the fuel station's rating. Optionally in this embodiment, the user may obtain other business information by selecting a convenient navigational link. A related embodiment displays a savings tool that estimates monetary savings by using the suggested fueling points along the specified route. In addition to these features, the webpage offers other relevant information, for example, weather, directions, and traffic conditions. A user may choose additional features displayed in the navigation bar, for example "blog." Market data is also displayed and updated in a ticker style format at the bottom of the interface.

Figure 22:
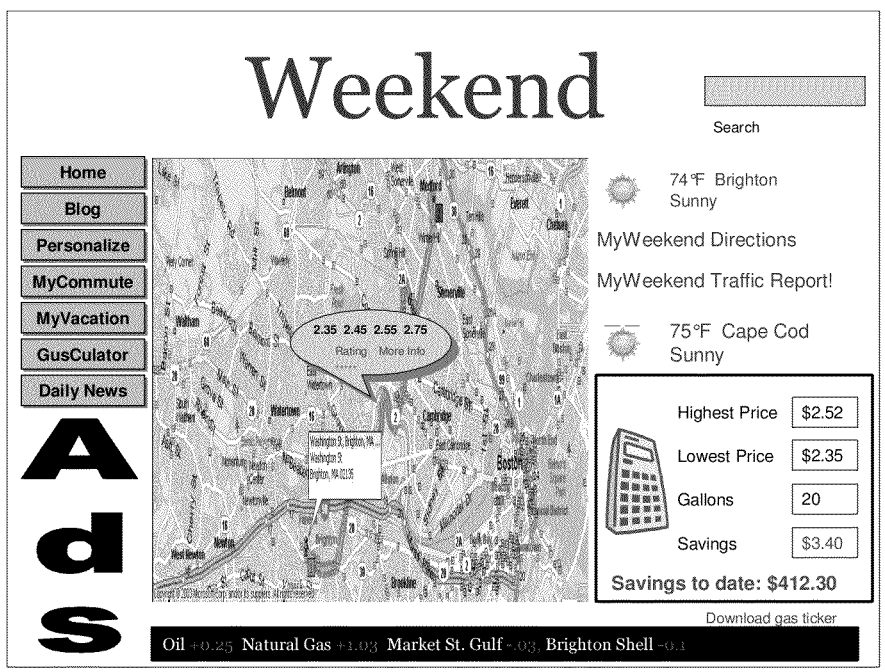
FIG. 22 illustrates an embodiment of the present invention by which a user may view a previously specified commute route.

FIG. 22 illustrates an embodiment of the present invention by which a user may view a previously specified commute route. In a related embodiment similar to FIG. 20, this webpage displays a pictorial diagram of the route. In a subsequent embodiment, the most economical fuel prices within a pre-determined distance from the route are displayed in addition to the fuel station's rating. In another related embodiment, the user may obtain other business information by selecting a convenient navigational link. A related embodiment displays a savings tool that estimates monetary savings by using the suggested fueling points along the specified route. In addition to these features, the webpage offers other relevant information, for example, weather, directions, and traffic conditions. A user may choose additional features displayed in the navigation bar, for example "blog." Relevant market data is also displayed and updated in a ticker style format at the bottom of the interface. Navigational links provide shortcuts to server webpages over the world wide web.

Figure 7:
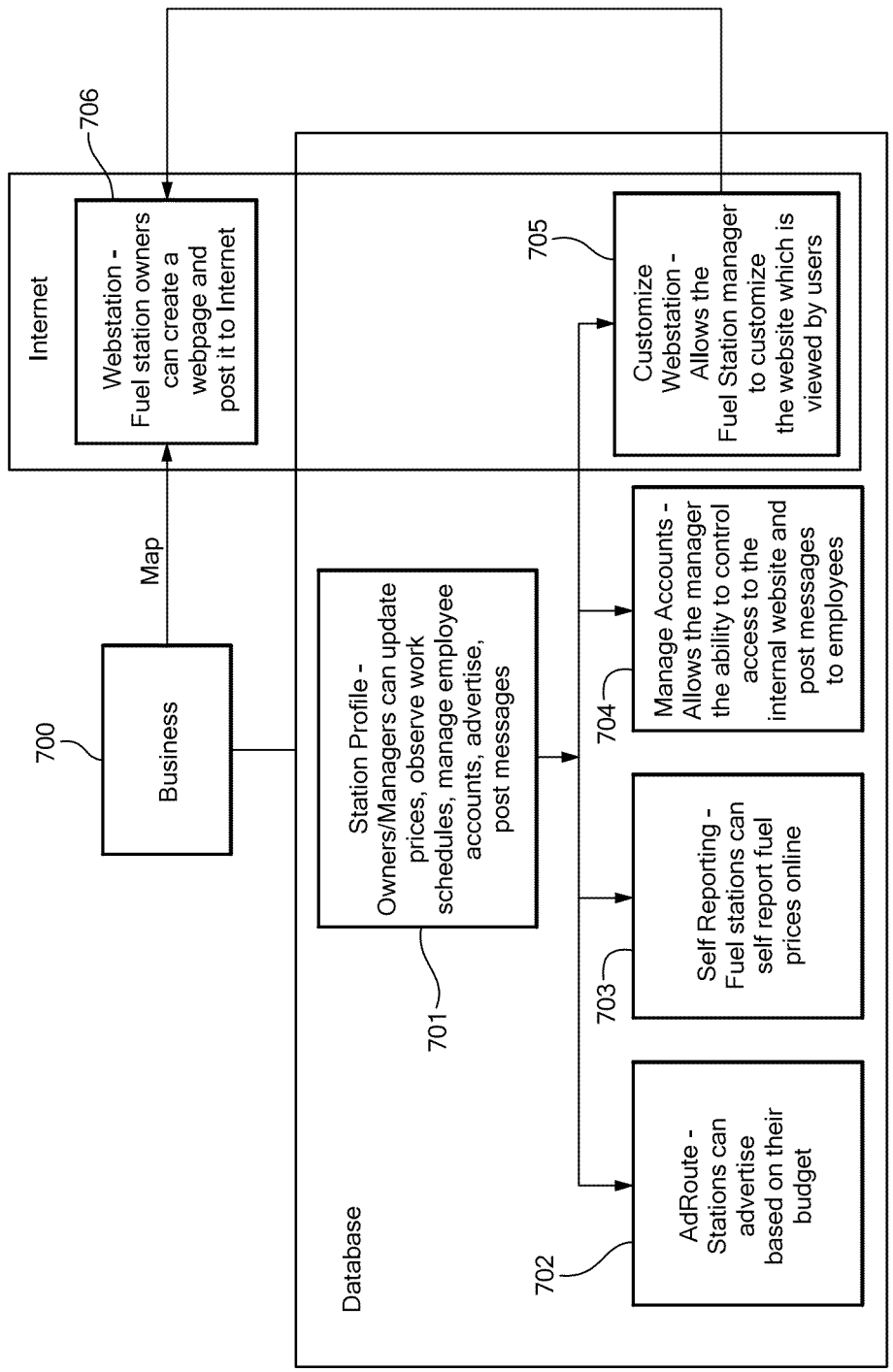
FIG. 7 illustrates a business experience in accordance with an embodiment of the present invention.

In this embodiment, FIG. 7, the business experience is illustrated. A Business 700 may manage the account and pricing information online and/or via telephone. The Station Profile page 701 allows the business manager and employees to update business information, such as fuel prices, observe work schedules, manage employee accounts, advertise, and post messages. Using the AdRoute feature 702, the business manager may select an item, advertising budget, and post the advertisement to the main website or to a network enabled device. The Self Reporting process 703 will allow the businesses to update their information over the Internet or telephone. The business manager may manage employee accounts, post messages, alter the work schedule, and update business contacts using the Manage Account webpage process 704. The business manager will also be able to modify the web station via process 705. The resulting information may be viewed by the user on the website 706.

Figure 13:
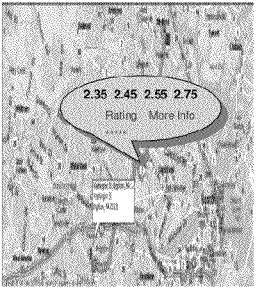
FIG. 13 is a representation of a web page designed to allow businesses to maintain a secured webspace and that allows management of business information in accordance with an embodiment of the present invention.

FIG. 13 is a representation of a web page in accordance with an embodiment of the present invention designed to allow businesses to maintain a secured webspace that allows management of business information (for example, employees' work schedule). Optionally in this embodiment the business may choose to upload or modify pictures displayed on the business' webspace. The business may also view current business information and associated rating displayed on the website. In another embodiment, the business may navigate to additional portions of the website (for example, Manage Accounts and Customize Web Station) via convenient links. Relevant market data is also displayed and updated in a ticker style format at the bottom of the interface. Navigational links provide shortcuts to server webpages over the world wide web.

FIG. 16 illustrates the aforementioned links as described in FIG. 13. In one embodiment of the present invention, a business may add, update, or delete employees' access to the webspace described in FIG. 13. Optionally in this embodiment, a business may create, update, or delete the employees' work schedule. In further related embodiments a business may store, update, or delete contact information (for example, distributors). In another related embodiment, the business may post messages to a ticker style display which can be edited.

FIG. 17 illustrates an embodiment of the present invention by which a business may personalize the web pages that are viewed by users on the website. In one embodiment, the business may add and/or update information about the business in the webstation template. Also provided on this web page is a template that allows business to discuss the range of services and products. In a further embodiment, the business may upload a picture to be viewed by users. Another embodiment allows the business to monitor the business information, such as prices, being viewed on the website. Moreover, the business may review the ratings and comments regarding their operations. In a further embodiment, the weather specific to the business location is displayed.

FIG. 18 is a representation of a web page in accordance with an embodiment of the present invention designed to allow users to view other business information about a business. In this embodiment, the user may view a description about the business, detailed information about the products and services offered, operating hours, contact information, and pictures of the business. In another embodiment, the user is able to view the location of the business on a map along with the associated business information, such as fuel prices. Optionally in this embodiment, a user may post a review for the business, rate the business using a scoring system, and view other users' reviews. A user may also observe the weather for the particular business.

Figure 8:
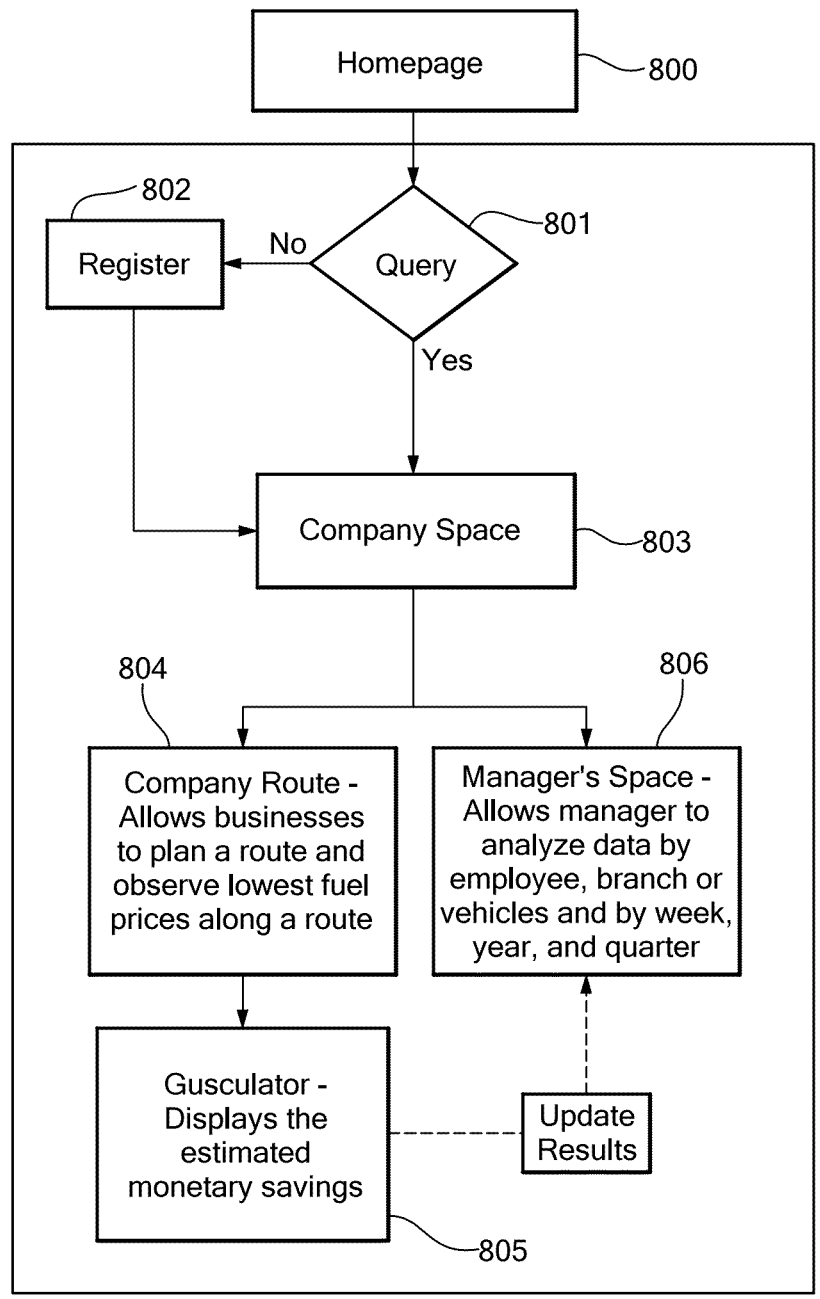
FIG. 8 illustrates an embodiment of the present invention by which a company may utilize a mechanism that measures cost efficiency.

FIG. 8 illustrates an embodiment of the present invention by which a company may utilize a mechanism that measures cost efficiency. This mechanism may be accessed via the homepage 800. The company is prompted in process 801 to register or provide an account number. To register using process 802 the company provides information and creates a password. Following a successful authentication, the Company Space (web page) 803 is displayed. The company may then access several tools. Company Route 804 allows the company to identify a route wherein a set of vendors and business information is displayed on the basis of geographic proximity to the route. For example, Gusculator 805 is a tool that displays and stores savings achieved through using this embodiment. Gusculator allows a company to post the information to the Managers Space in process 806 which may be used to analyze data by company users, vehicles, timeline, or other predetermined categories.

Figure 25:
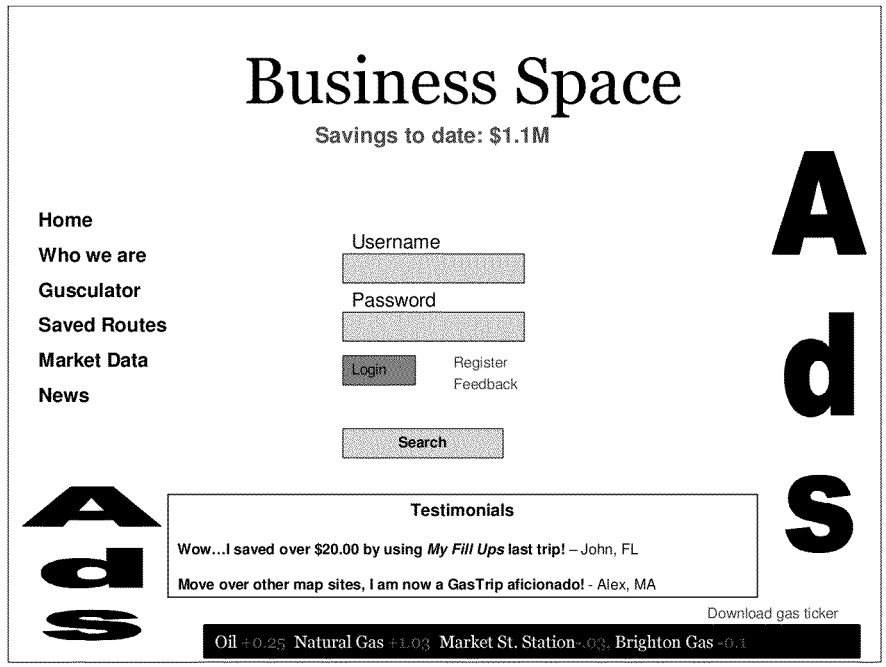
FIG. 25 is a representation of a web page providing an interface in accordance with an embodiment of the present invention.

FIG. 25 is a representation of a web page providing an interface in accordance with an embodiment of the present invention. By accessing this interface, with a network enabled device, the company may register via this interface to create an account so that the company may store a variety of preferences. Once registered, a company may login to the interface by entering a unique username and password. Relevant market data is also displayed and updated in a ticker style format at the bottom of the interface. Navigational links provide shortcuts to server webpages over the world wide web.

Figure 26:
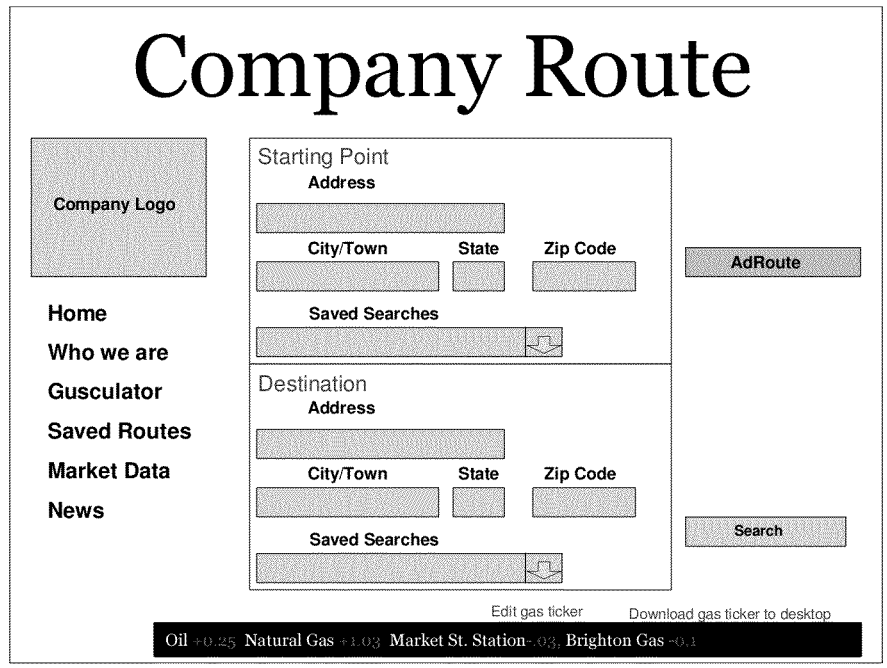
FIG. 26 is a representation of a web page providing an interface in accordance with an embodiment of the present invention.

FIG. 26 is a representation of a web page providing an interface in accordance with an embodiment of the present invention. By accessing this interface, with a network enabled device, the company may indicate the starting position of the route and the destination address. Relevant market data is also displayed and updated in a ticker style format at the bottom of the interface. Navigational links provide shortcuts to server webpages over the world wide web.

Figures 27, 28:
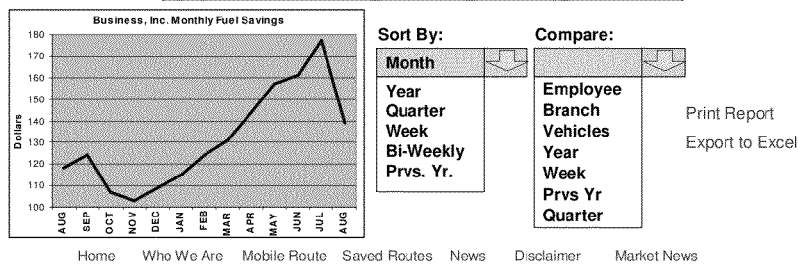
FIG. 27 is a representation of a web page that may be downloaded from the server by the company's device in accordance with an embodiment of the present invention.
FIG. 28 is a representation of a web page that may be downloaded from the server by the company's device in accordance with an embodiment of the present invention.

In response to information entered by the company as described above in connection with FIG. 26, a new web page may be downloaded from the server by the company's device as illustrated in FIG. 27. This web page provides the route resulting from the business' starting and destination information in FIG. 26. The driving directions along with a pictorial diagram of the desired route are displayed. Also provided on this web page are locations of vendors (e.g., fuel stations) of a product (e.g., vehicular fuel along a company specified route. In one embodiment, the display is of locations of vendors within a pre-determined distance from the route having the best prices, e.g., most economical fuel prices. Optionally in this embodiment, a savings tool displays the estimated monetary savings by using the suggested business locations along the specified route. In another embodiment, the display may be of locations of vendors selected on a desired basis, such as, for example, brand. In further related embodiments, business information, such as fuel prices, for each location along the route are displayed. In another related embodiment, the business information is displayable by, for example, using a mouse to move a graphical selection icon in the vicinity of the relevant location. In a further related embodiment, the company may obtain other business information by selecting a convenient navigational link. Relevant market data is also displayed and updated in a ticker style format at the bottom of the interface. Navigational links provide shortcuts to server webpages over the world wide web.

In response to information entered by the company as described above in connection with FIG. 26, a new web page will be downloaded from the server by the company's device as illustrated in FIG. 28. In one embodiment, this web page displays separate and/or combined savings by the company (for example, name, branch, vehicle, and savings this week) as well as a display a cumulative savings to date through using embodiment described in FIG. 8. In another related embodiment, a tool allows company to sort by predetermined date (for example, year, quarter, and week), compare by a category (for example, employee, branch, vehicles), and plot savings in a graphical type of display. In a further related embodiment, company may want to export the information to an ODBC compliant format (for example, Excel) or print the report containing a predetermined set of data points. Relevant market data is also displayed and updated in a ticker style format at the bottom of the interface. Navigational links provide shortcuts to server webpages over the world wide web.

Figure 9:
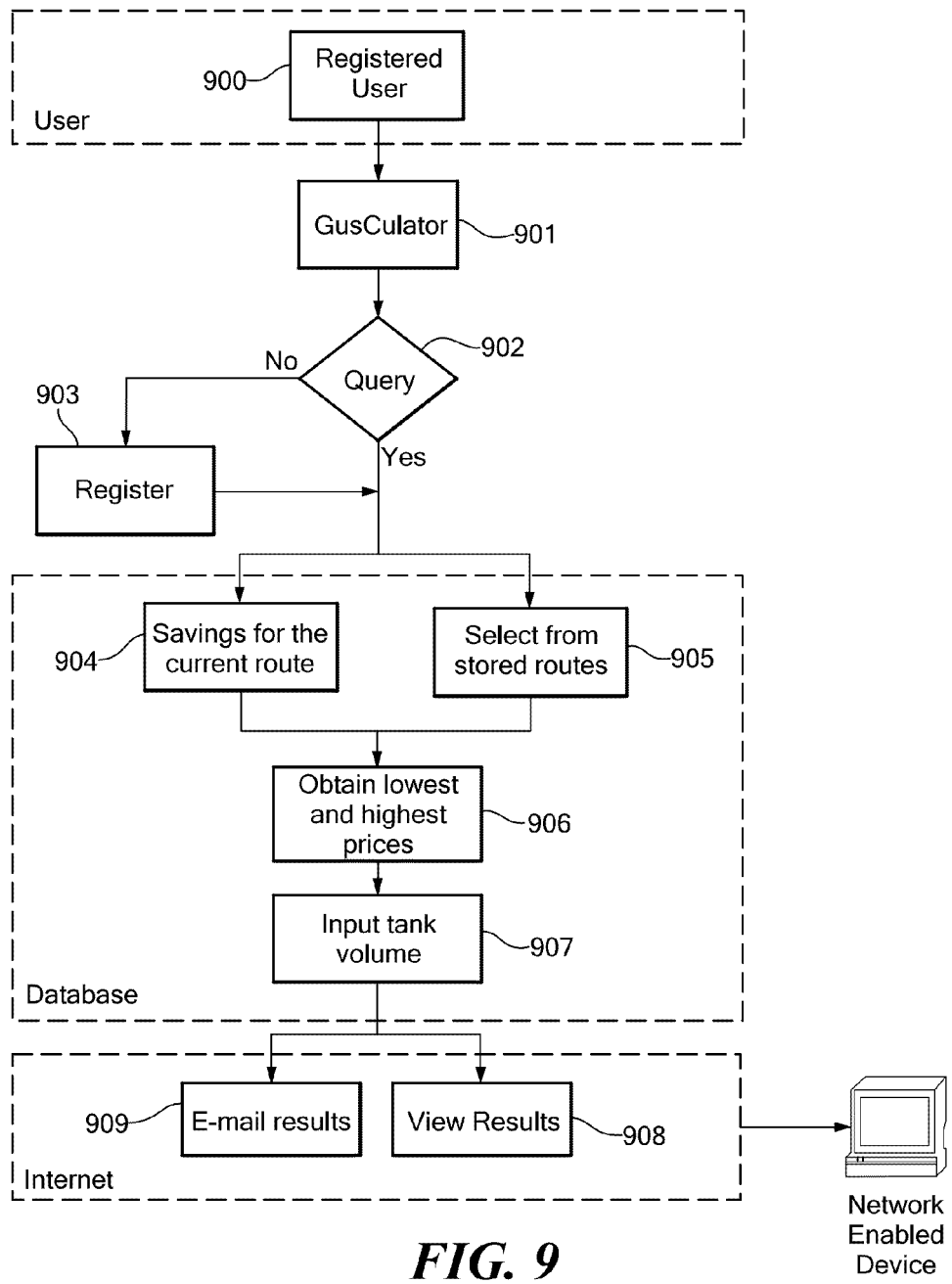
FIG. 9 illustrates a mechanism used to calculate savings in accordance with an embodiment of the present invention.

FIG. 9 illustrates a mechanism used to calculate savings. A user 900 may employ the Gusculator tool 901 that tracks the user's savings for the specified route and/or cumulatively over time. From this webpage the user is prompted to login via process 902 or register using process 903. After successful authentication, the user may choose to calculate savings along a user specified route in process 904 or previously stored routes via process 905. The database may display a range of product or service information, such as the lowest and highest prices, along a route 906. The user may input or select information related to the product or service, such as fuel tank volume, in process 907, which allows the database to calculate savings. The user may view the results in process 908 along the route and may also email the results using process 909.

FIG. 23 displays an embodiment of the present invention where the user and/or company may employ a savings tool that displays the estimated monetary savings along a specified route as described in FIG. 9. The tool automatically retrieves the product or service information, such as the highest and lowest fuel prices, from the computer database of self reported business information based on the user and/or company specified route. Savings are calculated based on the information related to the product or service, such as fuel tank volume, entered by the user and/or company on the website or obtained from previously stored information. In a related embodiment, a user and/or company may select previously stored routes on which to view cost savings (for example commute, vacation, and weekend). In one embodiment, the display is of locations of businesses within a pre-determined distance from the route having for example, the best prices, such as the most economical fuel prices. Relevant market data may be also displayed and updated in another embodiment viewed in a ticker style format at the bottom of the website. In a further related embodiment, the user and/or company may obtain other business information by selecting a convenient navigational link.

Figure 10:
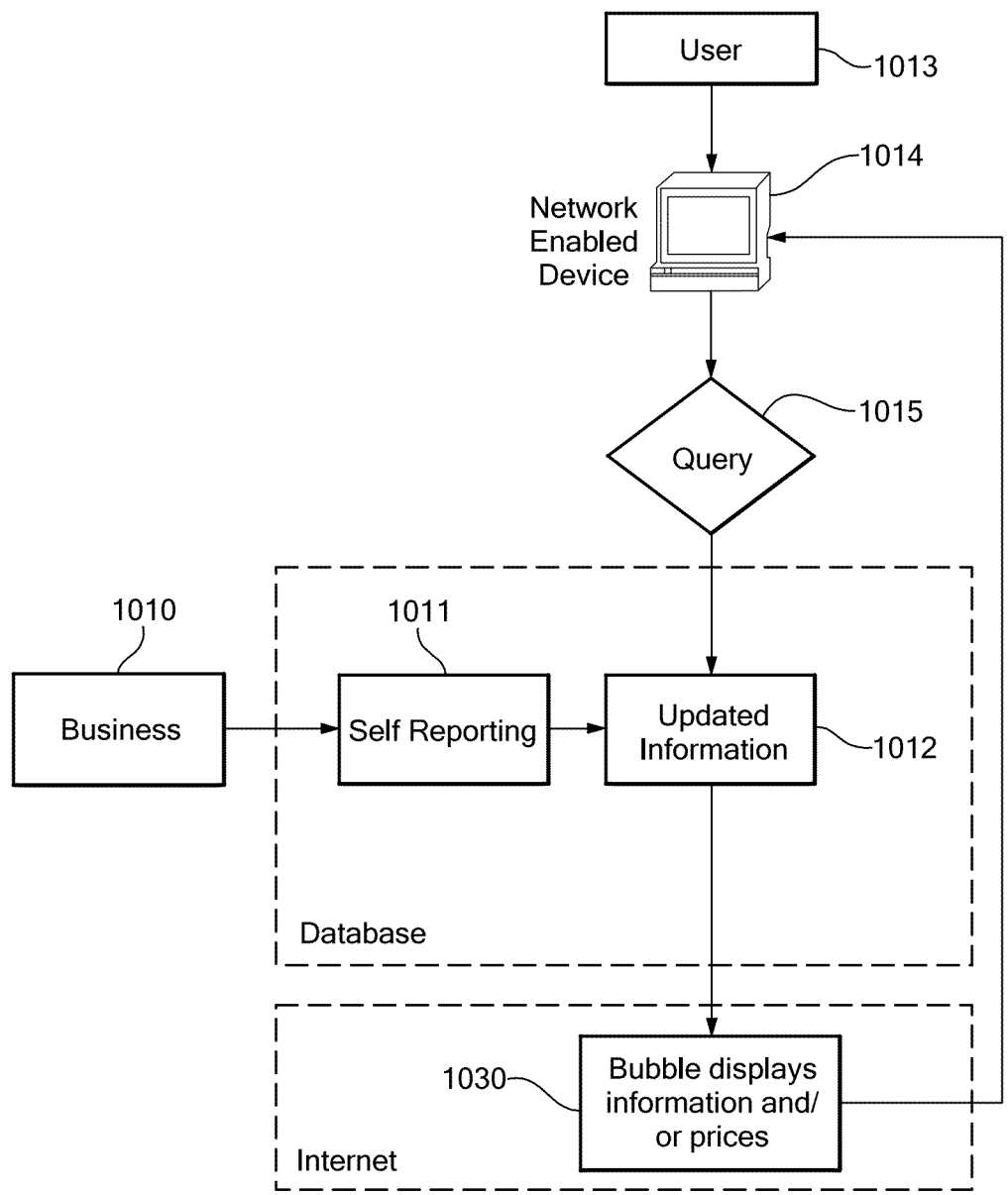
FIG. 10 illustrates a process that allows a user or a company to view business information along an identified route in accordance with an embodiment of the present invention.

FIG. 10 illustrates a process that allows a user or a company to view business information, such as fuel prices, and other business information along an identified route or in a given area by placing a cursor on a business that is displayed on a map. The process begins with the business 1010 logging into Self Reporting (see FIG. 2) via process 1011 and updating the business information, such as prices, and other relevant information in process 1012. The user 1013 using a network enabled device 1014 may query the database 1015, by dragging the cursor over the desired business on the displayed map. Performing this action will display an information bubble 1030 which displays the business information of the business.

FIG. 30 displays an embodiment of the present invention where the user and/or company may employ a tool that displays the business information, such as prices, along a specified route. The tool automatically retrieves the information from the computer database of self reported business information based on the specified route. In one embodiment, the business information, such as fuel prices, are displayable by, for example, using a mouse to move a graphical selection icon in the vicinity of the relevant location. In another embodiment, other business information, such as the name of the business, rating, and navigational link to more information about business is displayed. By selecting the rating navigational link, the user and/or company may observe the user reviews about the business. In a related embodiment a user and/or company may view additional business information and/or product information or navigate to the business' webspace.

Figure 31:
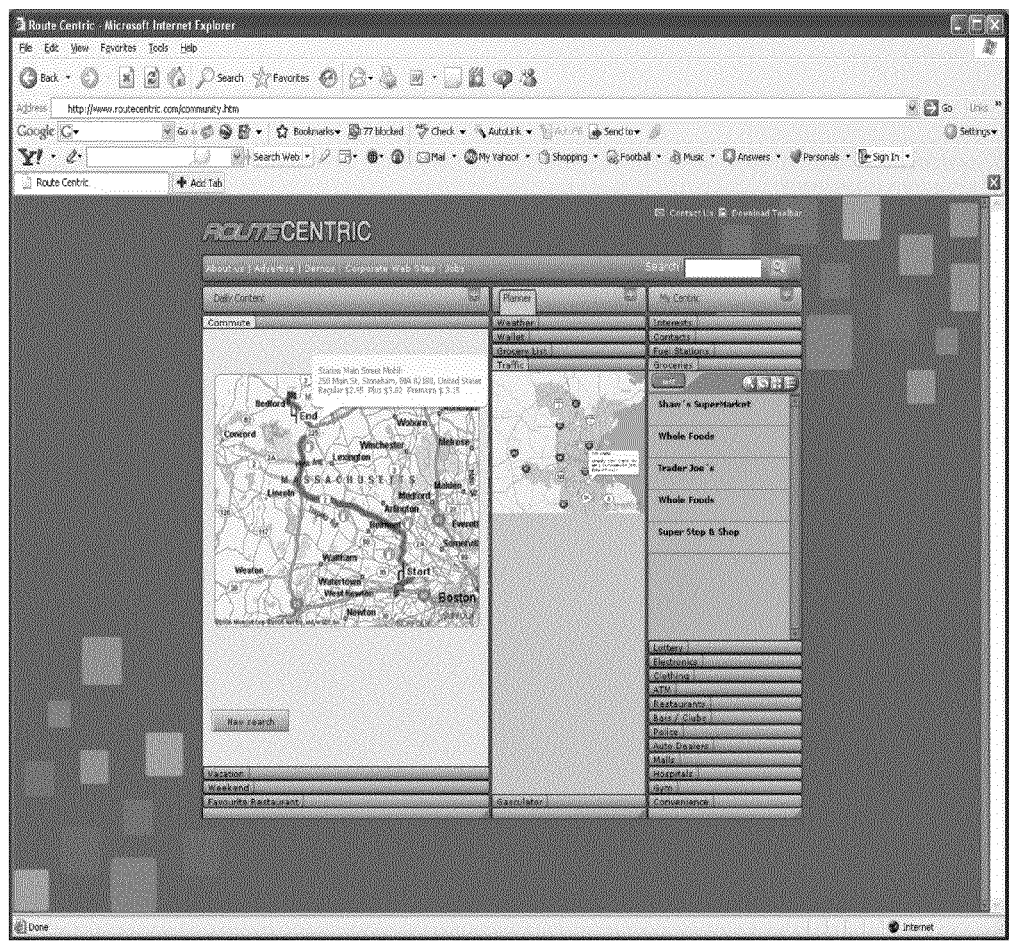
FIG. 31 is a representation of a web page providing an interface in accordance with an embodiment of the present invention.

FIG. 31 is a representation of a web page providing an interface in accordance with an embodiment of the present invention. A registered user will have the ability to retrieve stored routes and directions. In a related embodiment, the stored route (Commute, Vacation, Weekend, etc) may be populated with icons representing businesses within a user specified distance from the plotted route. In yet another embodiment, a user may view traffic conditions related to their stored route. This embodiment may update in accordance to the route being displayed. In another embodiment, by selecting a desired business category (e.g. groceries, Fuel Stations), a user may view the location of the requested businesses in a specified distance from the route.

Figure 32:
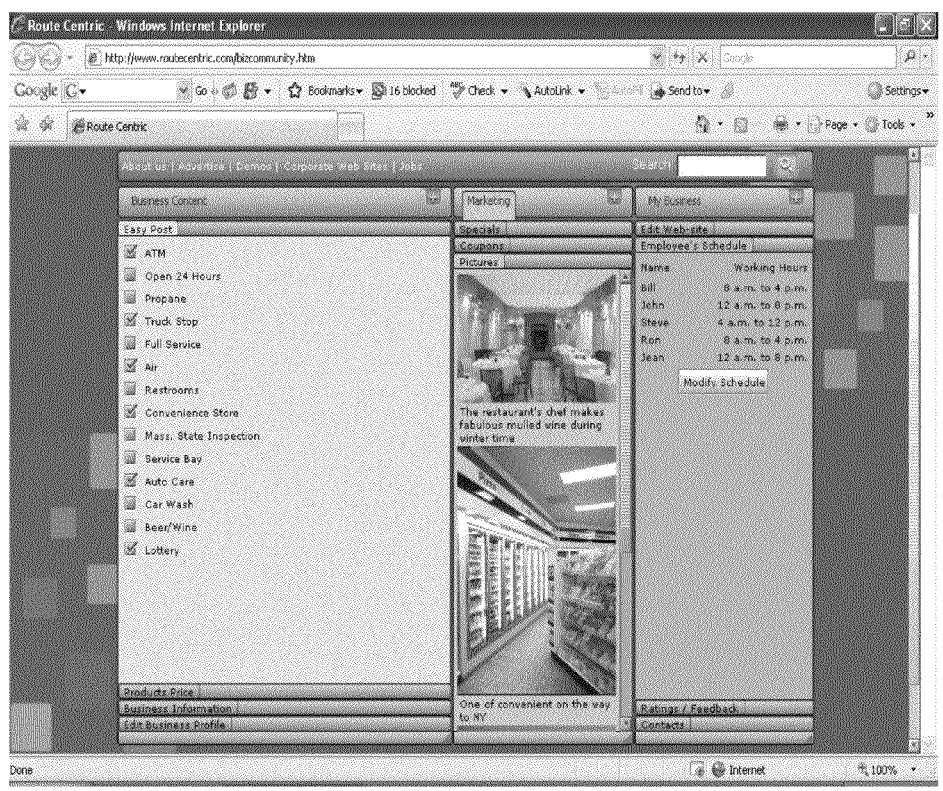
FIG. 32 displays an embodiment of the present invention where the business may update the information about the products and/or services offered by using a template.

FIG. 32 displays an embodiment of the present invention where the business may update the information about the products and services offered by using a template. The resulting information may be viewed by the user on the website. In a related embodiment the business may upload and/or update the business webspace with photos viewable to users on the website. In another embodiment, a business may create, update, or delete the employees' work schedules.

Figure 33:
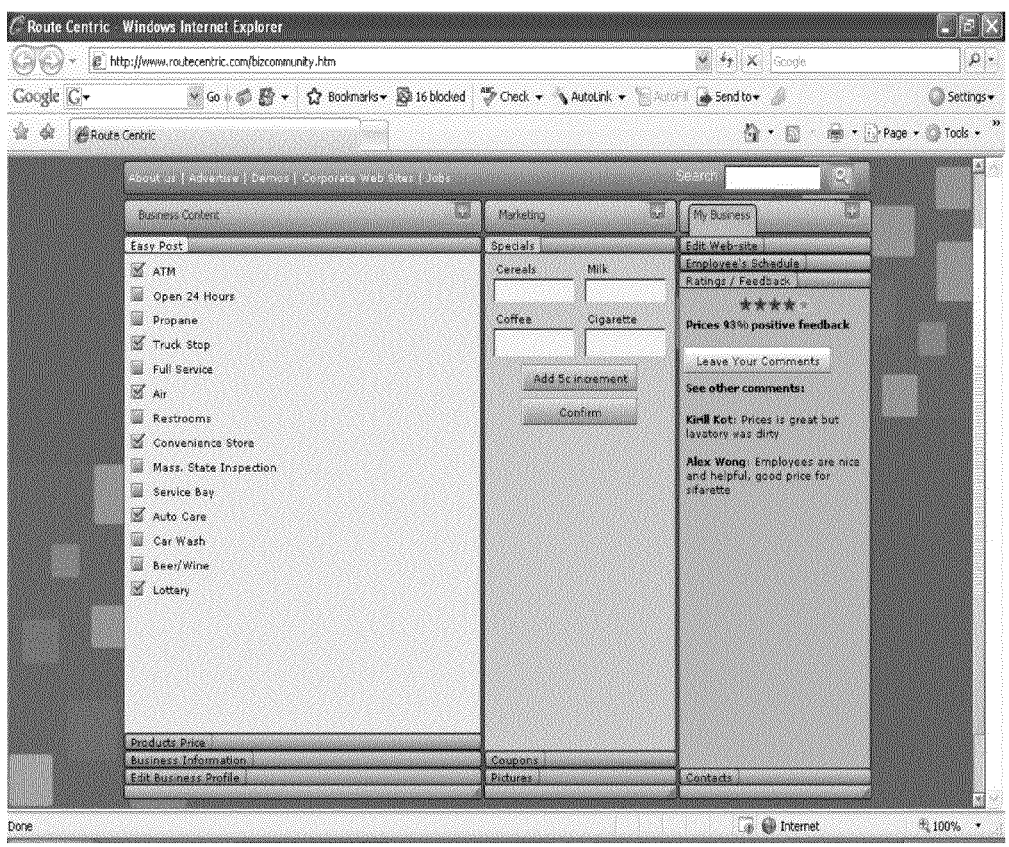
FIG. 33 illustrates an embodiment of the present invention that allows a business to post information regarding special pricing on offered products and/or services.

FIG. 33 illustrates an embodiment of the present invention that allows a business to post information regarding special pricing on offered products or services. A business may directly enter the price of a product or service or can add cost incrementally. In another embodiment the business may view and offer feedback to ratings posted by a user or community of users about the business.

Figure 34:
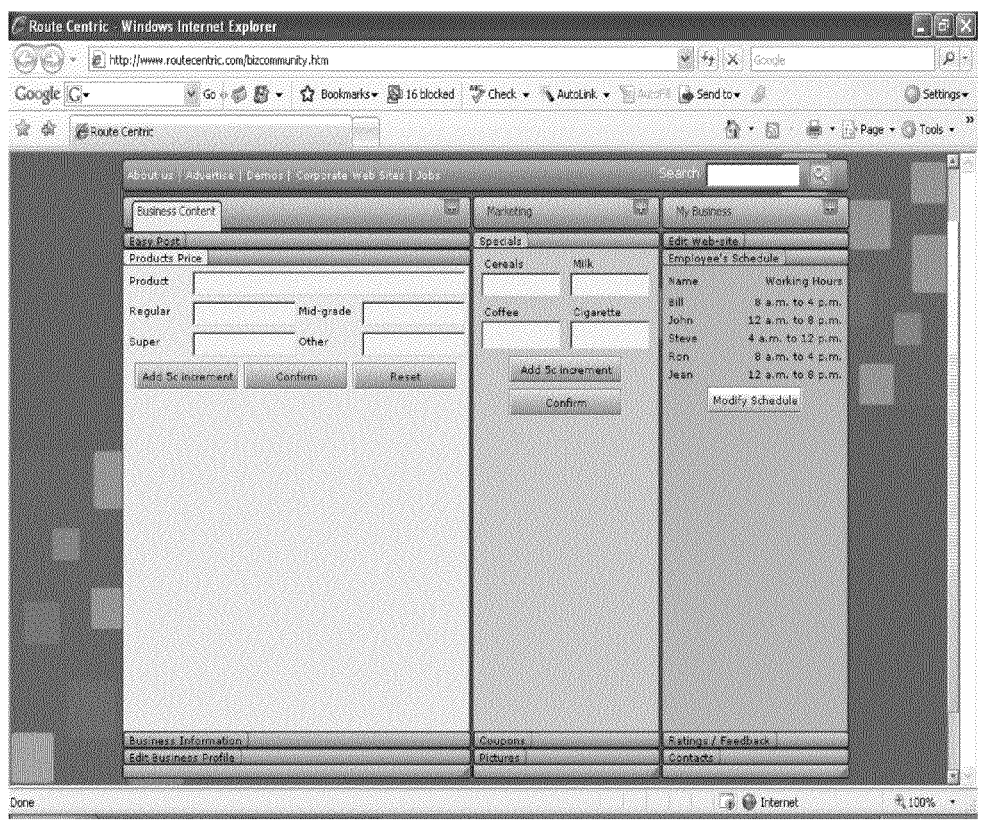
FIG. 34 displays an embodiment of the present invention that allows a business to specify the price of a product and/or service offered.

FIG. 34 displays an embodiment of the present invention that allows a business to specify the price of a product or service offered. A business may directly enter the price or can add cost incrementally. A business may either confirm or reset the changes made to the price.

Figure 35:
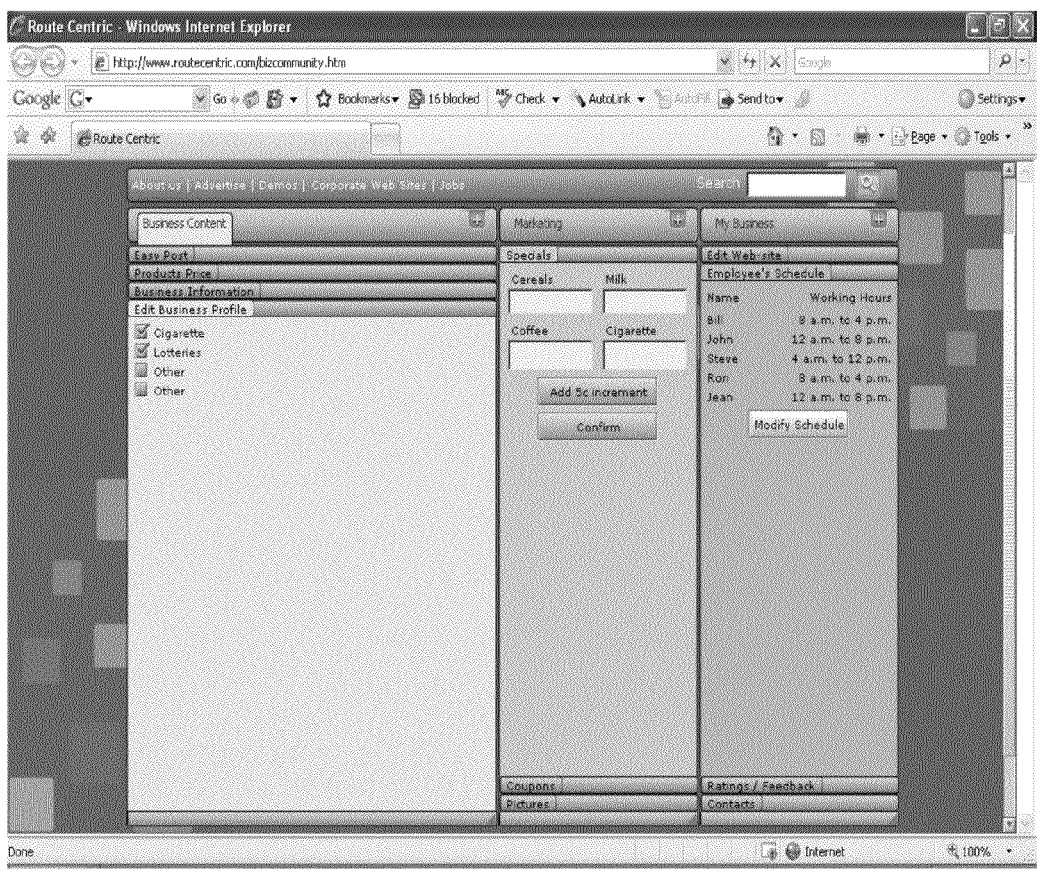
FIG. 35 represents an embodiment of the present invention that allows a business to add other product and/or services being offered.

FIG. 35 represents an embodiment of the present invention that allows a business to add other product and/or services being offered in addition to the embodiment described in FIG. 32.

Figure 36:
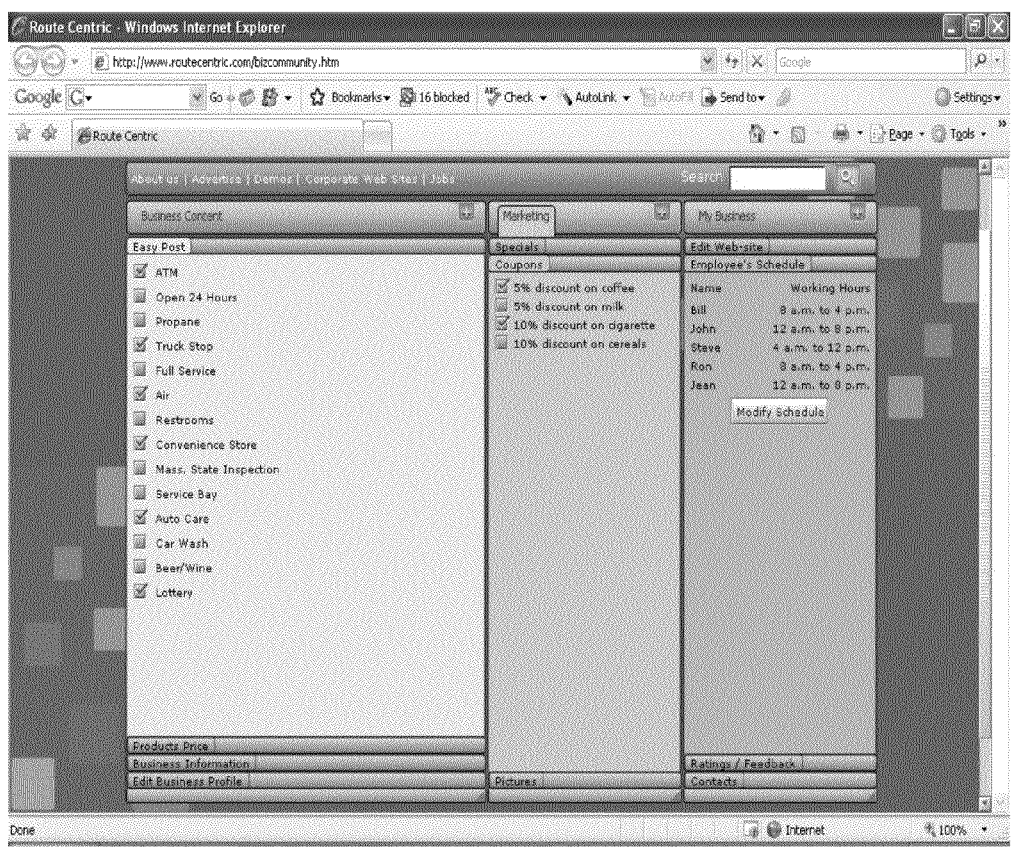
FIG. 36 illustrates an embodiment of the present invention that allows a business to offer coupons with a discount on a specified product and/or service.

FIG. 36 illustrates an embodiment of the present invention that allows a business to offer coupons with a discount on a specified product and/or service.

Figure 37:
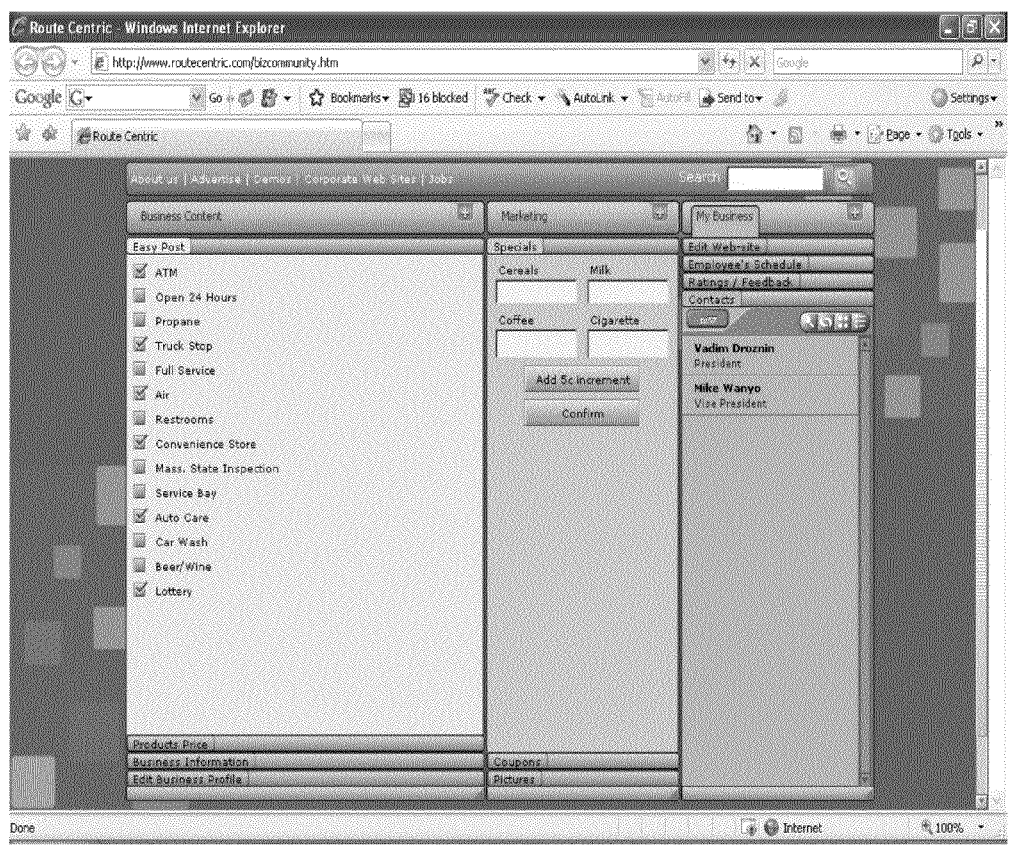
FIG. 37 displays an embodiment of the present invention that allows a business to view, add, and modify business information that may be viewed by employees.

FIG. 37 displays yet another embodiment of the present invention that allows a business to view, add, and modify business information, such as contact information, that may be viewed by employees.

Figure 38:
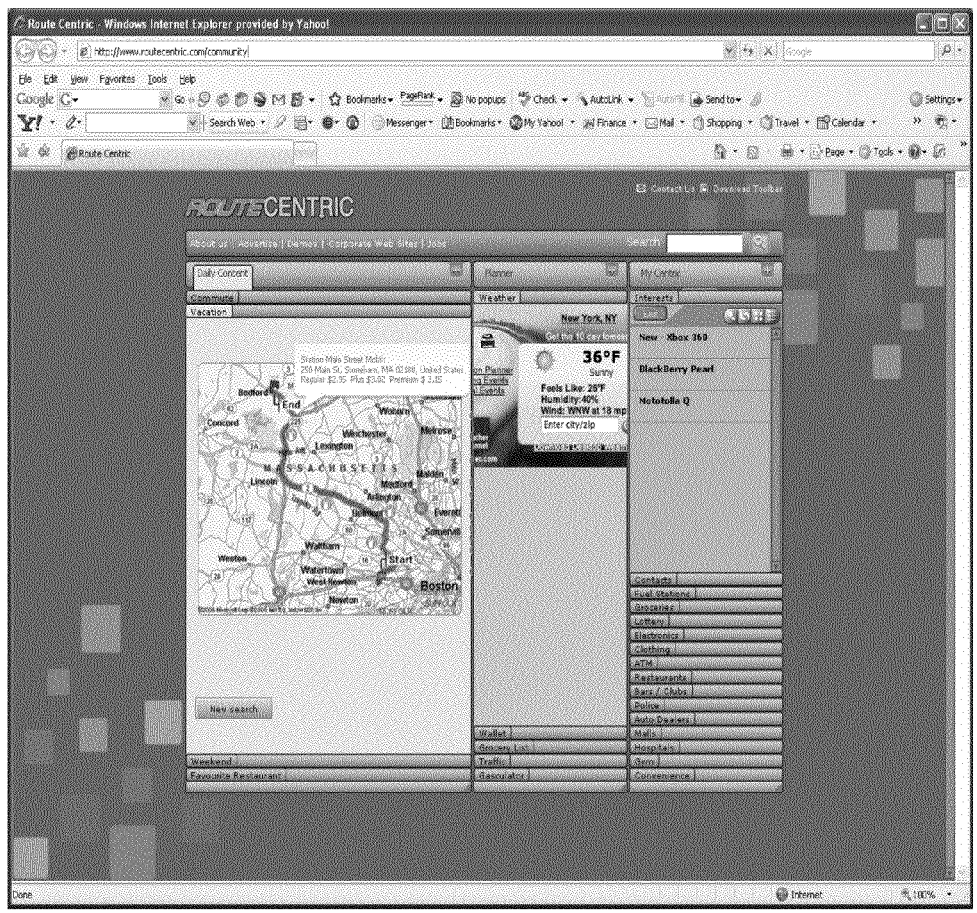
FIG. 38 illustrates an embodiment of the present invention that allows a registered user to view the weather forecast related to a specified route.

FIG. 38 illustrates an embodiment of the present invention that allows a registered user to view the weather forecast related to a specified route. In a related embodiment, the user may view the weather forecast at any given point along the specified route. In another embodiment a user may search for goods and/or services along the route. The user may have the option to update the specified route with the location of businesses offering the queried products and/or services.

Figure 39:
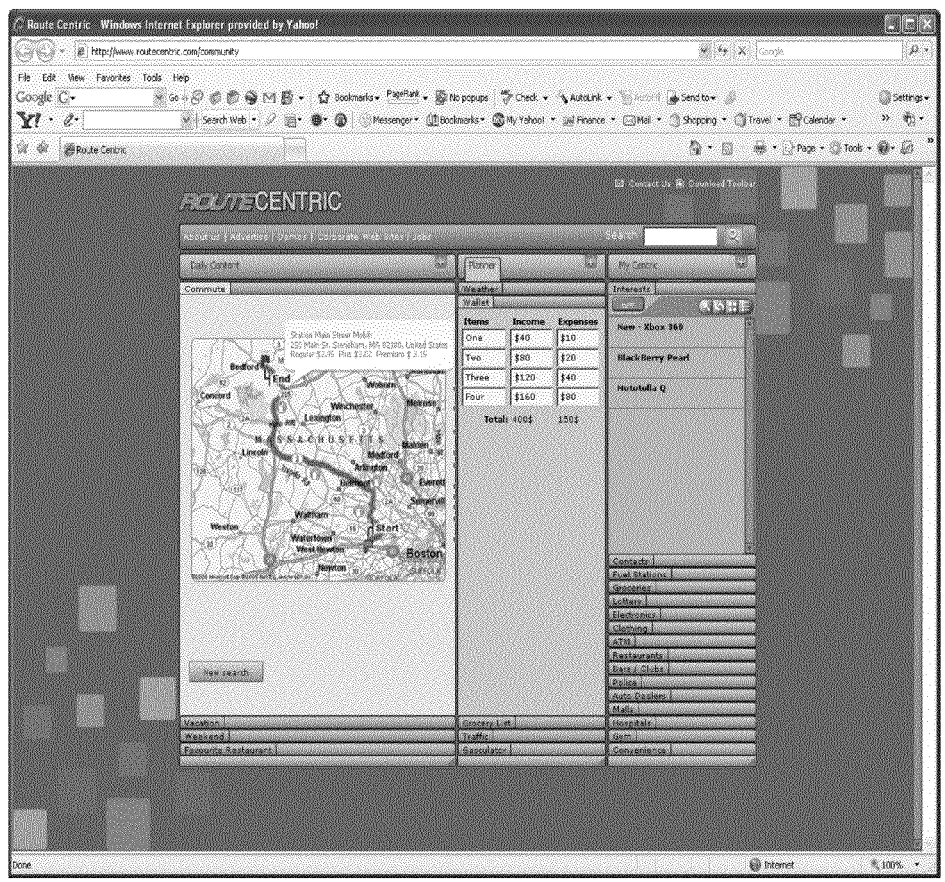
FIG. 39 displays an embodiment of the present invention where a user may track and maintain a log of expenses and income.

FIG. 39 displays an embodiment of the present invention where a user may track and maintain a log of expenses and income. The user may specify budgets related to specific routes.

Figure 40:
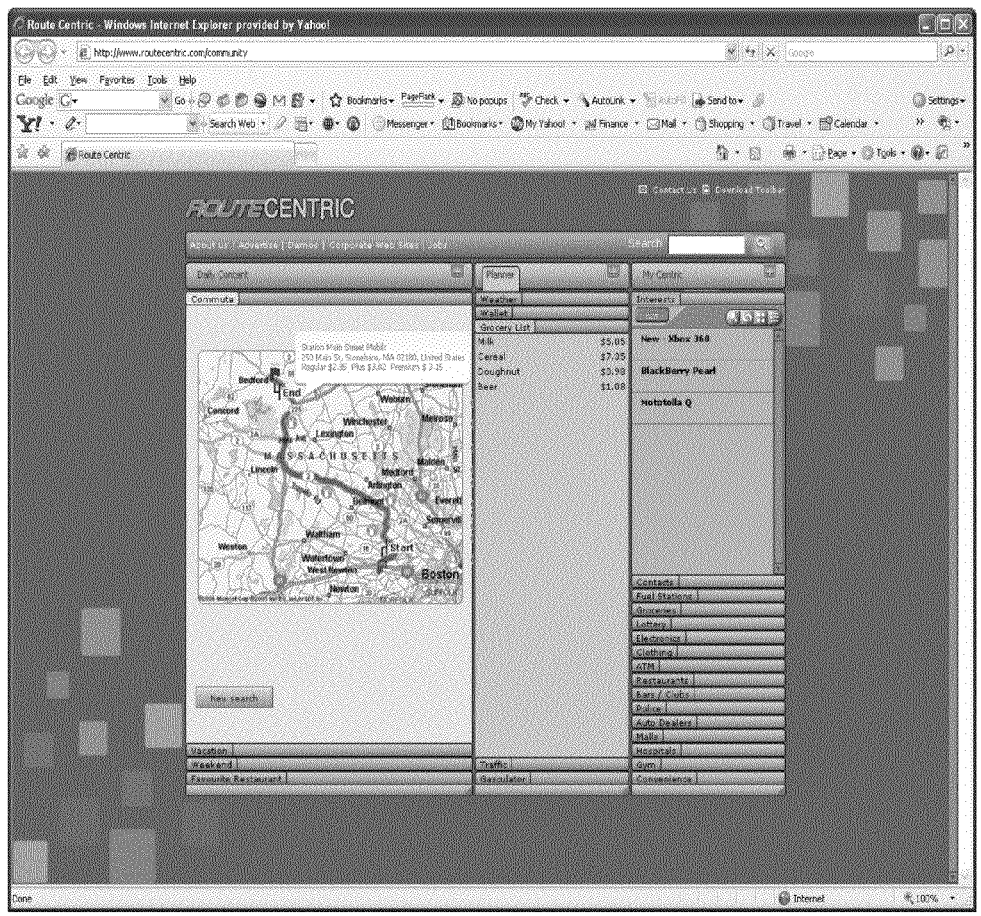
FIG. 40 displays an embodiment of the present invention where a user may create user specific lists that may be relayed to a network enabled device.

FIG. 40 displays an embodiment of the present invention where a user may create grocery lists, shopping lists, reminders, memos, and user specific lists that may be relayed to a network enabled device.

Figure 41:
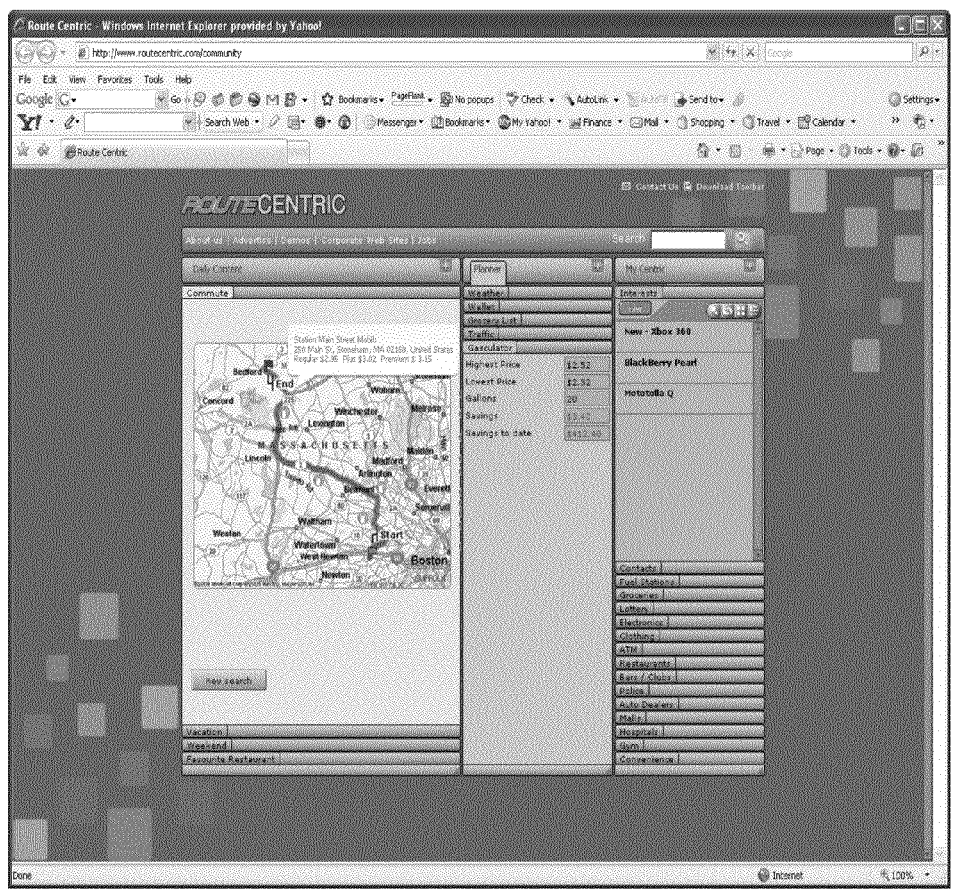
FIG. 41 displays an embodiment of the present invention where the user may employ a savings tool that displays the estimated monetary savings along a specified route.

FIG. 41 displays an embodiment of the present invention where the user may employ a savings tool that displays the estimated monetary savings along a specified route. The tool automatically retrieves information, such as the highest and lowest fuel prices, from the computer database of self reported business information based on the user's specified route. Savings are calculated based on the information related to the product or service, such as fuel tank volume, entered by the user on the website or obtained from previously stored information. In a related embodiment, a user and/or company may select previously stored routes on which to view cost savings (for example commute, vacation, and weekend). In one embodiment, the display is of locations of businesses within a pre-determined distance from the route having for example, the best prices, such as the most economical fuel prices.

Figure 42:
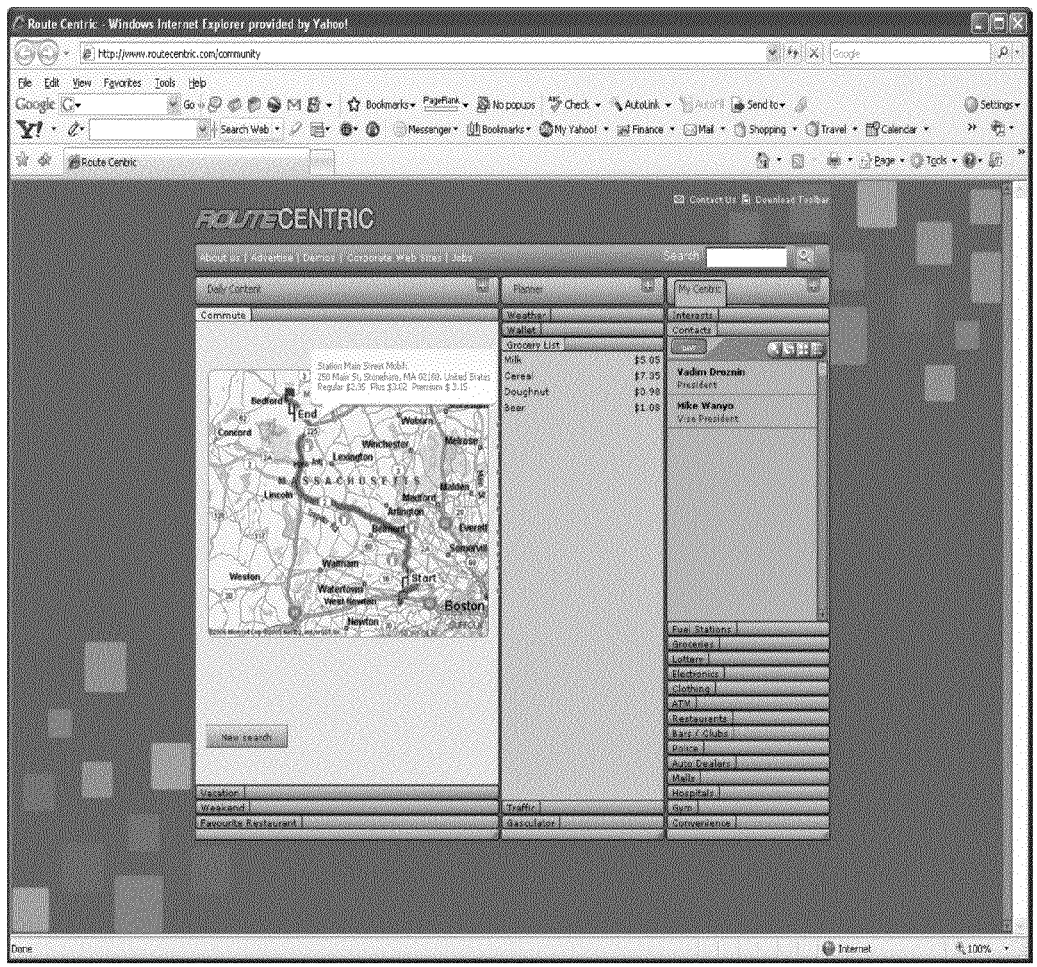
FIG. 42 displays an embodiment of the present invention where a user may create and save a list of contacts.

FIG. 42 displays an embodiment of the present invention where a user may create and save a list of contacts. The listing may contain links to the user's webspace, email address, contact information, profiles, etc.

Figure 43:
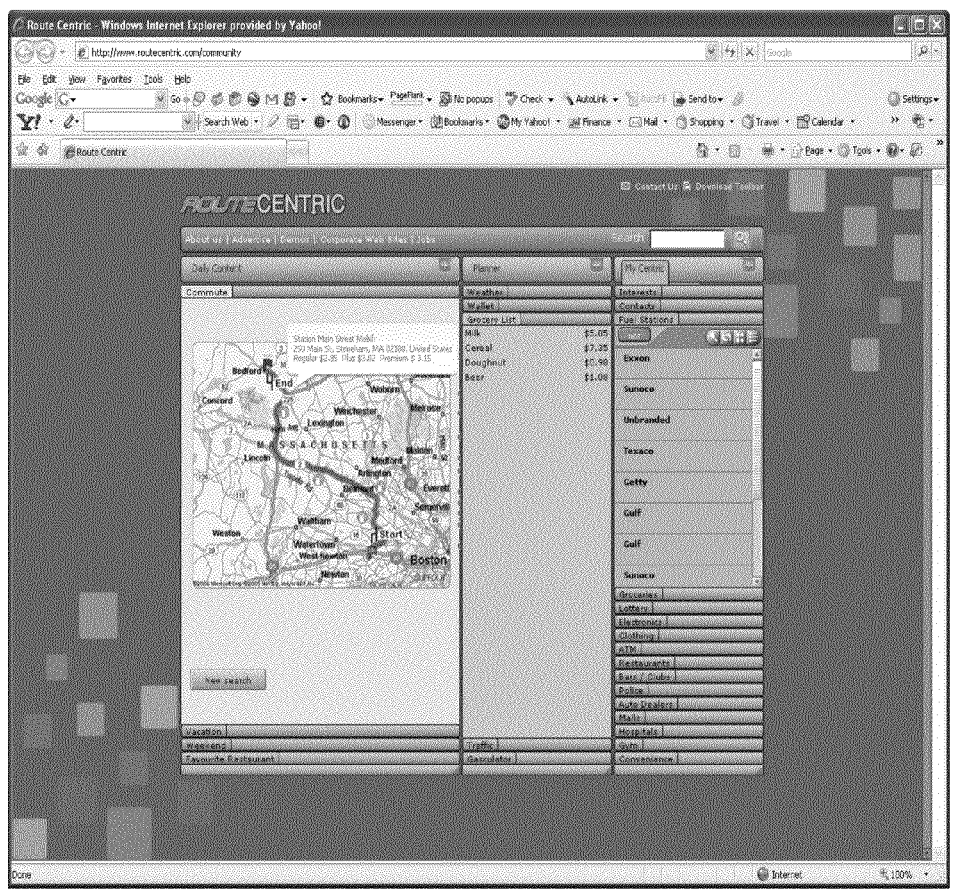
FIG. 43 displays an embodiment of the present invention in which a user may store business information within multiple categories.

FIG. 43 displays an embodiment of the present invention in which a user may store business information within multiple categories (e.g. Fuel Stations, Grocery Stores, Clothing, ATMs, etc.). When selecting a category the user can view a list of the businesses in that category as well as their locations along the specified route. The user can modify the list of businesses or allow the database to display the most relevant business information. In yet another embodiment the user can set the parameters to allow businesses in the specified proximity to the route, send information (special deals, coupons, and incentives) directly to user's network enabled device.

Figure 44:
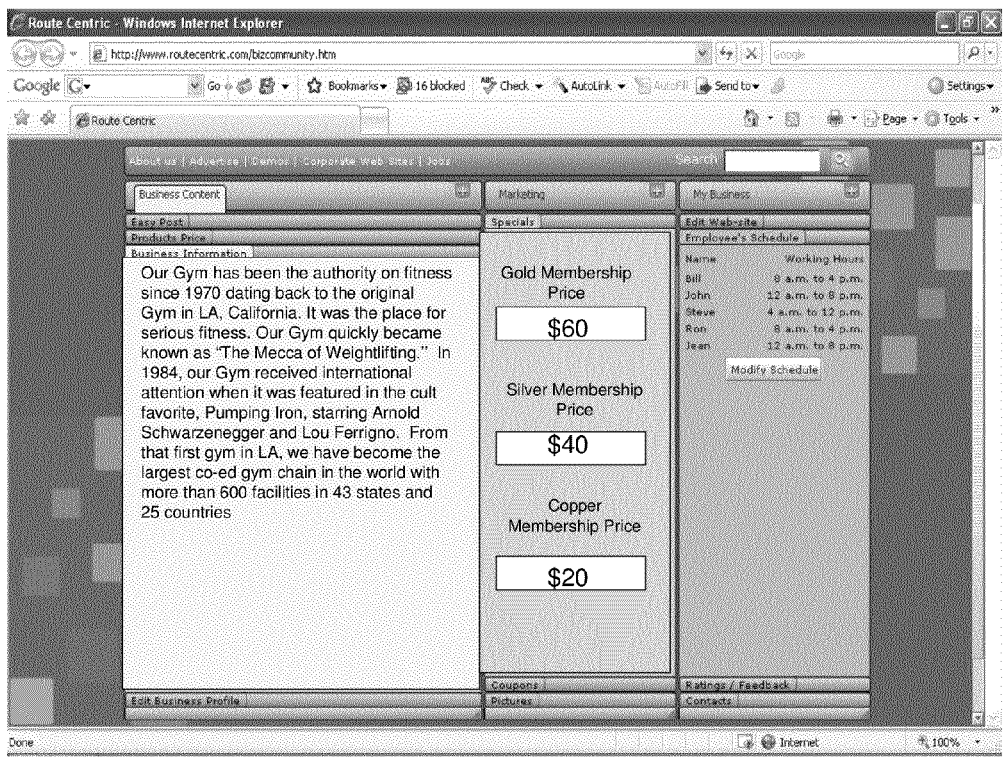
FIG. 44 displays an embodiment of the present invention where the business may update the information contained within its webspace.

FIG. 44 displays an embodiment of the present invention where the business may update the information contained within its webspace. The business may generate an introductory statement that is displayed to users. In a related embodiment, the business may customize a list of special offers catered to the users in proximity to their location. These special offers, such as sales prices or coupons, may be displayed on their webspace and may be also sent to the user via the network enabled device.

Figure 45:
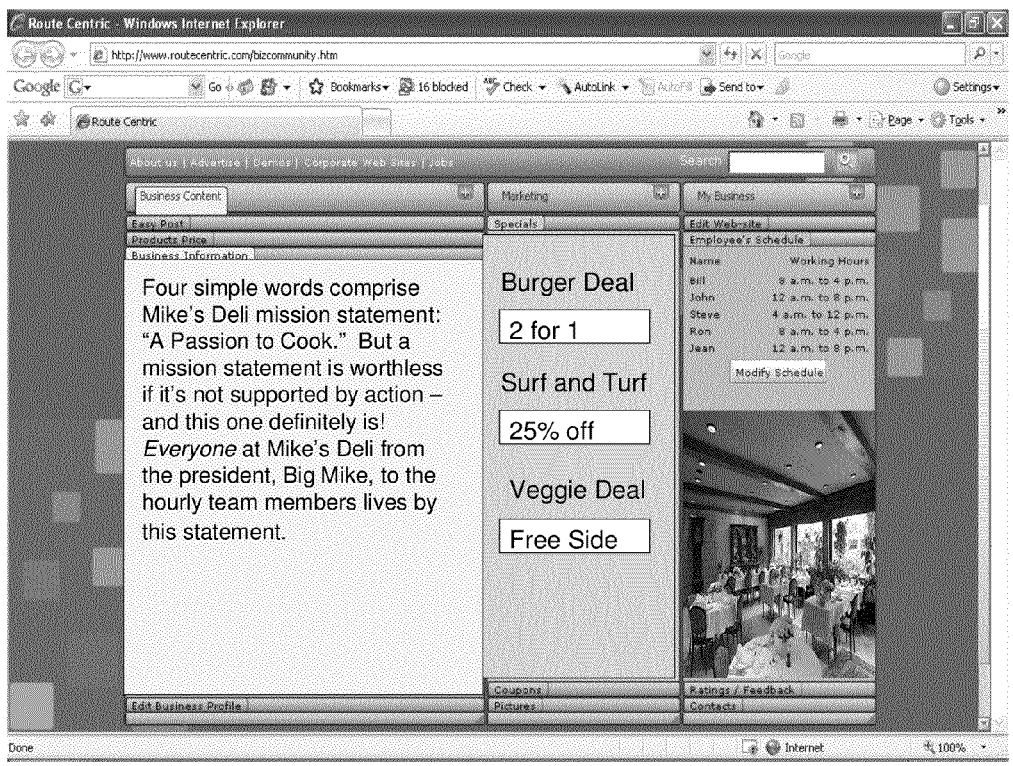
FIG. 45 displays an embodiment of the present invention where the business may customize their webspace.

FIG. 45 displays an embodiment of the present invention where the business may customize their webspace. In addition, a business may upload a photo or video that may be viewed by employees or users.

Figure 46:
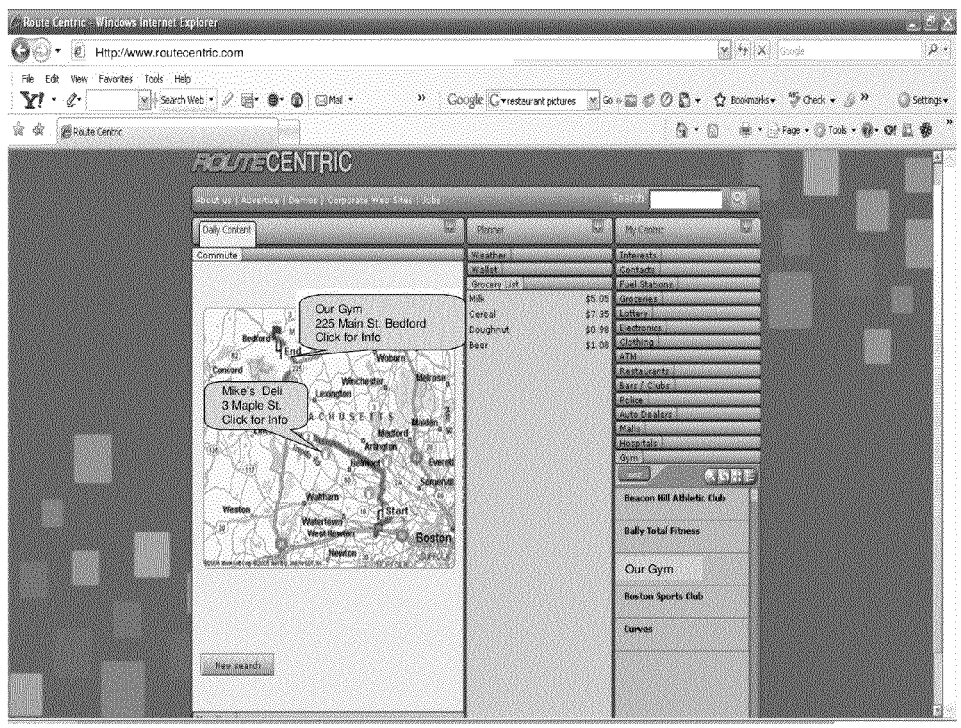
FIG. 46 displays an embodiment of the present invention that allows a user to view multiple types of businesses along their contemplated route.

FIG. 46 displays an embodiment of the present invention that allows a user to view multiple types of businesses along their contemplated route. The user may specify the types of business and set the maximum distance they are willing to travel from the contemplated route. In a related embodiment, the user may view a stored list of preferred businesses and may save new businesses to those lists. The businesses along the route may be updated when a new category is selected.

FIG. 47 displays an embodiment of the present invention that allows a business to bid for a display of advertisements via the network enabled device to users traveling a predetermined route and/or according to the user's specified interests. The business may input the products and/or service being advertised as well as other associated information, such as price. The business may add text to accompany the advertisement. In a related embodiment, the business may set its advertising budget or add to the remaining budget. Prices for advertisement may depend on the distance from a contemplated route.

What is claimed is:

1. A method of providing advertising to a user or community of users over a network, the method comprising:
   receiving from the user a query identifying a contemplated route;
   accessing a computer database of self-reported business information from vendors, each vendor having an identified geographic location, wherein the self-reported business information has been previously supplied by the vendors through an interface and stored in the database, wherein the interface is configured so that each vendor can also specify an advertising budget;
   providing to the user or community, over the network, information from the database concerning the business information of a set of vendors extracted from the database on the basis of geographic proximity to the route identified by the user; and
   providing to the user or community, over the network in response to the query, advertising from the set of vendors based, at least in part, on data retrieved from the database and on advertising budgets supplied by the set of vendors.

2. A method according to claim 1, wherein the network includes the internet, a wireless telephone network, a telephone network, a GPS network, or any combination thereof.

3. A method according to claim 1, wherein the business information includes vehicular fuel prices.

4. A method according to claim 1, wherein the information provided to the user or community of users is prioritized on the basis of ratings provided by users.

5. A method according to claim 1, wherein the query further identifies product information and the provided information is further extracted from the database on the basis of the product information identified by the user or community of users.

6. A method according to claim 1, further comprising:
   pricing the advertising based, at least in part, on distance of each vendor's geographic location from the contemplated route.

7. A method according to claim 1, wherein the information provided to the user or community of users allows the user or community of users to share the business information.

8. A computer system for providing information about vendors to a user or community of users, the computer system comprising:
   a digital storage medium in which is stored a computer database of self-reported business information and an advertising budget supplied by the vendors through an interface, each vendor having an identified geographic location that is stored in the database; and
   wherein the computer system is running processes comprising:
      receiving from the user a query identifying a contemplated route;
      accessing the computer database;
      providing to the user or community, over the network, information from the database concerning the business information of a set of vendors extracted from the database on the basis of geographic proximity to the route identified by the user; and
      providing to the user or community, over the network in response to the query, advertising from the set of vendors based, at least in part, on data retrieved from the database and on advertising budgets supplied by the set of vendors.

9. A computer system according to claim 8, wherein the self-reported business information includes vehicular fuel prices.

10. A computer system according to claim 8, wherein the information provided to the user or community of users is prioritized on the basis of ratings provided by users.

11. A computer system according to claim 8, wherein the query received by the user further identifies product information, and the provided information is further extracted from the database on the basis of the product information identified by the user.

12. A computer system according to claim 8, wherein the computer system is running a further process comprising:
   pricing the advertising based, at least in part, on distance of each vendor's geographic location from the contemplated route.

13. A computer system according to claim 8, wherein the information provided to the user or community of users allows the user or community of users to share the business information.

* * * * *